United States Patent
Shimabukuro et al.

(10) Patent No.: US 6,695,744 B2
(45) Date of Patent: Feb. 24, 2004

(54) ENGINE-RESTART STARTING CONTROL SYSTEM FOR TRANSMISSION

(75) Inventors: Eijiro Shimabukuro, Wako (JP); Naohisa Morishita, Wako (JP); Takamichi Shimada, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/163,872

(22) Filed: Jun. 7, 2002

(65) Prior Publication Data

US 2003/0022757 A1 Jan. 30, 2003

(30) Foreign Application Priority Data

Jul. 18, 2001 (JP) ........................................ 2001-218335

(51) Int. Cl.[7] .............................................. B60K 41/02
(52) U.S. Cl. ..................... 477/102; 477/90; 477/121; 477/181
(58) Field of Search ............................. 477/83, 90, 101, 477/102, 107, 115, 121, 156, 167, 181; 701/113; 123/179.3

(56) References Cited

U.S. PATENT DOCUMENTS

| 4,558,416 A | * 12/1985 | Pauwels et al. ............. 701/114 |
| 5,272,630 A | * 12/1993 | Brown et al. ............. 477/121 X |
| 6,258,008 B1 | * 7/2001 | Tabata et al. ............... 477/107 |
| 6,422,972 B1 | * 7/2002 | Eguchi ....................... 477/107 |

FOREIGN PATENT DOCUMENTS

| JP | 358098658 | * 6/1983 | |
| JP | 363064835 | * 3/1988 | .................. 477/121 |
| JP | 404071936 | * 3/1992 | ............. 477/181 X |
| JP | 11-351372 | 12/1999 | |
| JP | 2000-35122 | 2/2000 | |

* cited by examiner

*Primary Examiner*—Ha Ho
(74) *Attorney, Agent, or Firm*—Arent Fox Kintner Plotkin & Kahn, PLLC

(57) ABSTRACT

A transmission comprises an engine, which is controllable to stop under a predetermined condition, and a speed change mechanism TM, which transmits the output rotation of the engine at different speed ratios. The speed change mechanism TM has a plurality of transmission paths (the LOW ratio, the SECOND speed ratio, etc.) disposed in parallel, a plurality of ratio-setting clutches (the LOW clutch 11, the SECOND speed clutch 12, etc.), each clutch for selecting a predetermined transmission path, and a speed change control system for selectively supplying a hydraulic pressure to any of the ratio-setting clutches to bring it into engagement. Engagement-initiation time is calculated for each ratio-setting clutch, so that the ratio-setting clutch requiring a minimum engagement-initiation time is selected as the clutch for the start-up speed ratio. When the engine is restarted from stopped state, this clutch for the start-up speed ratio is supplied with oil.

6 Claims, 14 Drawing Sheets

ENGINE-RESTART STARTING CONTROL SYSTEM FOR TRANSMISSION

FIELD OF THE INVENTION

The present invention relates to a starting control system which transmits the output rotation of an engine with a rotational speed change executed by a speed change mechanism, stops the engine under a predetermined condition, restarts the engine and supplies oil to a frictionally engaging element to bring it into engagement so as to set a start-up speed ratio for the speed change mechanism.

BACKGROUND OF THE INVENTION

There has been a proposal and a development for a vehicle whose engine is controlled to stop, for example, when the vehicle is stopped with the accelerator being closed and the brake being operated, to improve the fuel efficiency of the vehicle and, at the same time, to reduce the noise and exhaust. In such a vehicle, when the accelerator pedal is pressed while the engine is in stopped state, the engine is immediately started again, and the vehicle is controlled to start again.

Such a vehicle incorporates an automatic transmission as a transmission device. In this automatic transmission, speed change ratios are set by frictionally engaging elements (hydraulic clutches, hydraulic brakes, etc.), each of which is actuated by a supply of oil from an oil pump driven by the engine. While the engine is not operated, oil is not supplied to the frictionally engaging elements. Therefore, when the engine is started again, oil must be supplied promptly to the frictionally engaging element that actuates the speed change ratio used for the starting of the vehicle, so that the vehicle will start smoothly.

For this purpose, for example, Japanese Laid-Open Patent Publication No. H11(1999)-351372 discloses a starting control that increases quickly the pressure of oil supplied to actuate the clutch for setting the start-up speed ratio when the engine is restarted, so that the vehicle will start again without any lag. This quick pressure increase control is executed in variation so as to correspond well to the speed ratio that is used as the start-up speed ratio. Furthermore, Japanese Laid-Open Patent Publication No. 2000-35122 discloses a learning control which determines whether the quick pressure-increase control executed as mentioned above is performed effectively or not and which reflects the result of this determination to the next session of the quick pressure increase control. The quick pressure increase control is to increase quickly the pressure of oil supplied to the frictionally engaging element, so that the frictionally engaging element is quickly brought into a condition where it is ready for real engagement.

By the way, there are differences in response among the frictionally engaging elements. The time required for each frictionally engaging element, which receives a rapid supply of oil, to reach the condition where it is ready to start real engagement is different because the oil passage leading from the oil supply source to each frictionally engaging element and the pressure chamber of each frictionally engaging element are different. As a result, the volume to be filled with oil in the quick pressure increase control is different for each case. If the volume is relatively large, even if oil is supplied rapidly, there may be a lag in the engagement of the frictionally engaging element. As a result, the vehicle may not start smoothly.

SUMMARY OF THE INVENTION

It is an object of the present invention to provide an engine-restart starting control system which can supply oil to the frictionally engaging element of a start-up speed ratio as quickly as possible when the engine is restarted.

To achieve this objective, the present invention provides an engine-restart starting control system for a transmission which comprises an engine and a speed change mechanism (for example, the speed change mechanism TM described in the following embodiment). The engine is controllable to stop under a predetermined condition, and the speed change mechanism is to transmit the output rotation of the engine at different speed ratios. The speed change mechanism comprises a plurality of transmission paths arranged in parallel (for example, the LOW ratio, the SECOND speed ratio, the THIRD speed ratio, the FOURTH speed ratio, the FIFTH speed ratio and the REVERSE speed ratio described in the following embodiment), a plurality of frictionally engaging elements (for example, the LOW clutch 11, the SECOND speed clutch 12, the THIRD speed clutch 13, the FOURTH speed clutch 14 and the FIFTH speed clutch 15 described in the following embodiment) for selecting individually the transmission paths, and engagement-pressure supply control means (for example, the speed change control system described by the hydraulic circuit diagrams shown in FIG. 6~FIG. 10) for selectively supplying a hydraulic pressure to the frictionally engaging elements so as to selectively bring the frictionally engaging elements into engagement. In this automatic transmission, the engagement-initiation time required for the pressure of each frictionally engaging element to reach a predetermined engagement pressure when the hydraulic pressure is supplied by the engagement-pressure supply control means is calculated for each of the frictionally engaging elements, so that the frictionally engaging element requiring a minimum engagement-initiation time is selected as the frictionally engaging element for a start-up speed ratio. When the engine is restarted from stopped state, the pressure supply control means directs a supply of oil to the above selected frictionally engaging element for the start-up speed ratio.

According to this construction of the engine-restart starting control system, the frictionally engaging element that requires the minimum engagement-initiation time to reach the predetermined engagement pressure is selected as the frictionally engaging element for the start-up speed ratio. When the engine is restarted from stopped state to start the vehicle, the pressure supply control means supplies oil to this frictionally engaging element for the start-up speed ratio, which requires the minimum engagement-initiation time, and brings it into engagement. As a result, the vehicle is controlled to start smoothly and quickly without any lag.

It is preferable that oil-temperature detecting means be provided to detect the temperature of oil supplied to the frictionally engaging element, and that the engagement-initiation time required for the pressure of the frictionally engaging element to reach the predetermined engagement pressure when the hydraulic pressure is supplied by the engagement-pressure supply control means is calculated for each possible oil temperature for each of the frictionally engaging elements. With this arrangement, the frictionally engaging element that requires the minimum engagement-initiation time at the temperature detected by the oil-temperature detecting means is selected as the frictionally engaging element for the start-up speed ratio. In this way, the engagement-initiation time is minimized for any possible temperature of the oil, so that the vehicle can be controlled to start without any lag.

Also, it is preferable that this system be provided with characteristic memory means for storing the engagement-initiation time characteristic of each frictionally engaging element. When a frictionally engaging element is supplied with oil and brought into engagement at the restarting of the engine from stopped state, the engagement-initiation time characteristic is determined by measurement, and this determined engagement-initiation time characteristic is preferably replaced and renewed with the engagement-initiation time characteristic stored in the characteristic memory means. In this way, an optimal control can be executed to meet the actual characteristic of the frictionally engaging element used for the start-up speed ratio.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus are not limitative of the present invention.

DESCRIPTION OF THE PREFERRED EMBODIMENTS

Now, a preferred embodiment according to the present invention is described in reference to the drawings. FIGS. 1 through 4 show an automatic transmission which comprises a transmission according to the present invention. The automatic transmission AT incorporates, in a transmission housing HSG, a torque converter TC, which is connected to the output shaft Es of an engine, a parallel shaft speed change mechanism TM, which is connected to the output member (turbine) of the torque converter TC, and a differential mechanism DF including a last reduction driven gear 6b, which meshes with a last reduction drive gear 6a provided in the speed change mechanism TM. The drive power for the vehicle is transmitted through the differential mechanism DF to lateral wheels.

Figure 3A:
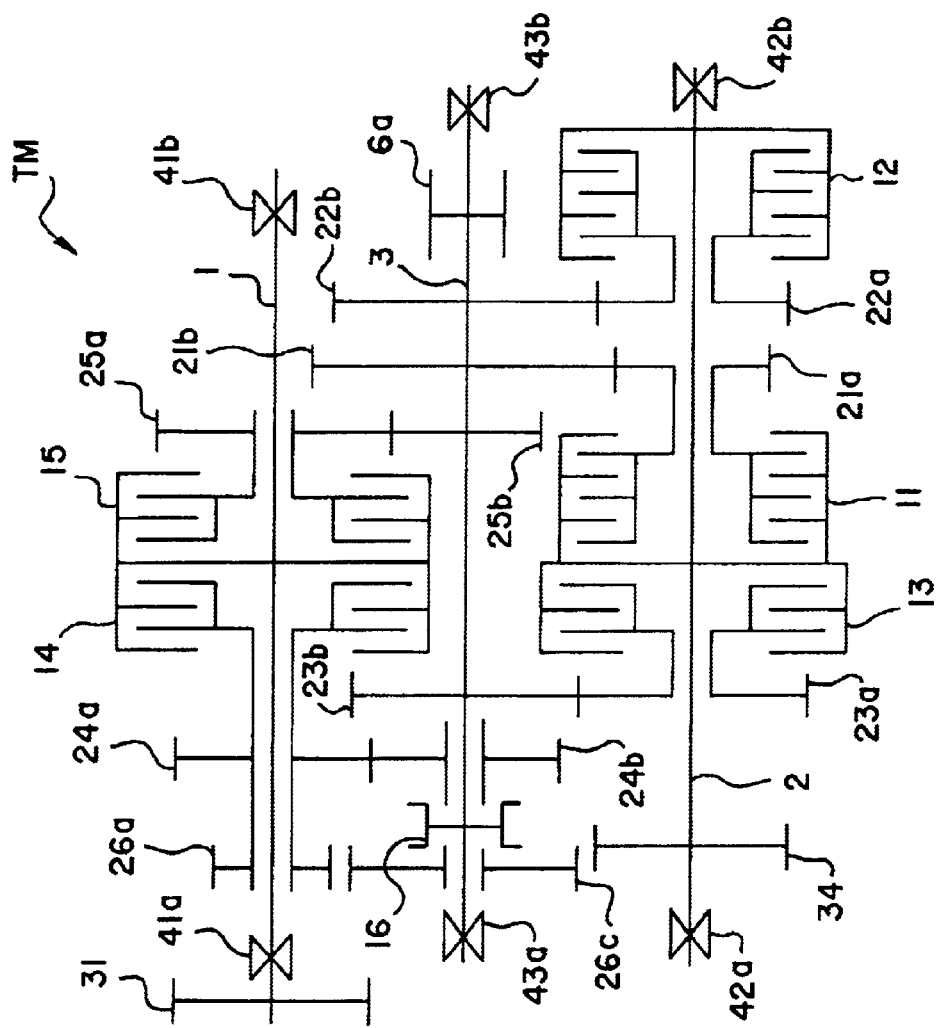
FIG. 3 is a skeleton diagram which shows schematically the transmission system of the automatic transmission.
Figure 3B:
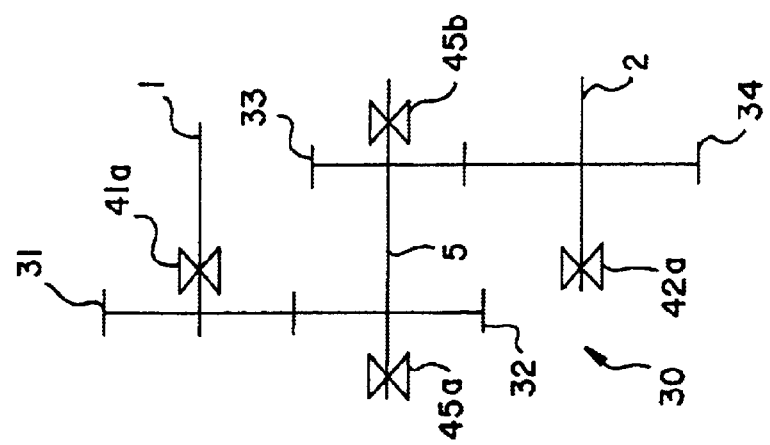
Figure 4:
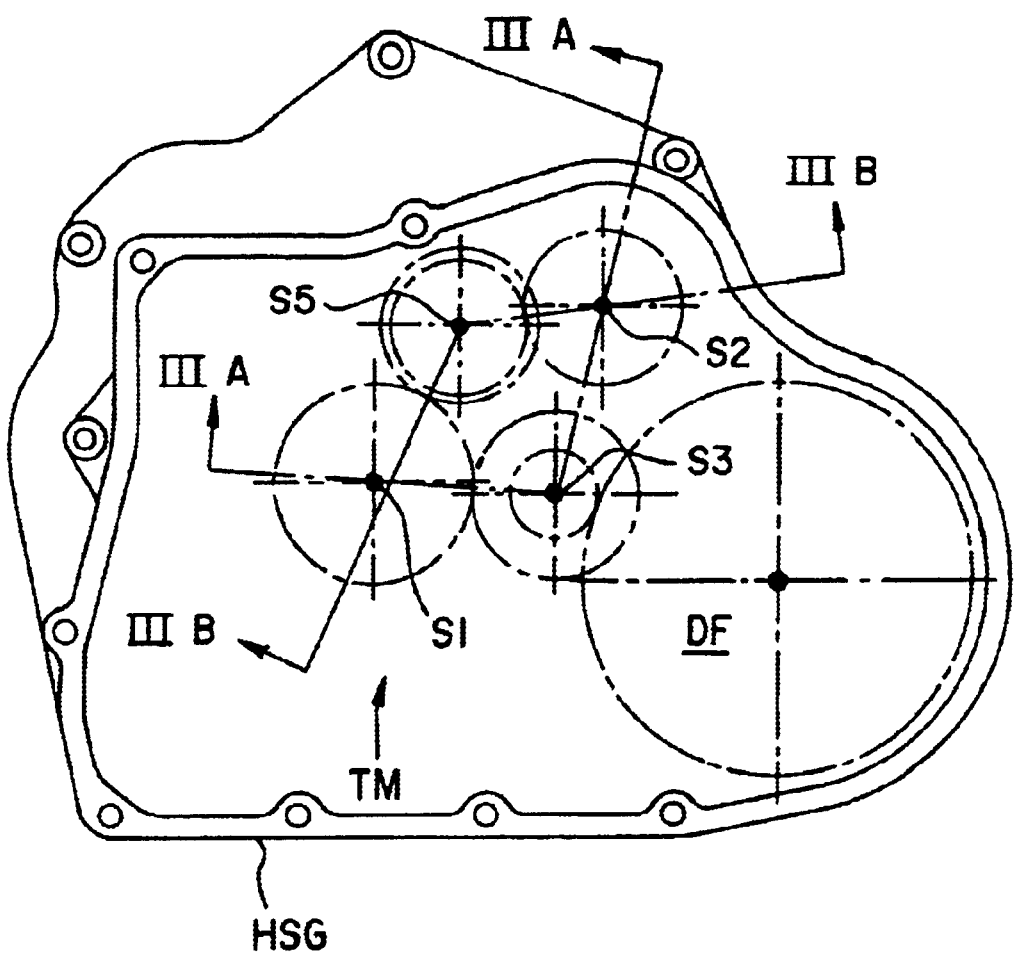
FIG. 4 is a schematic diagram showing the relative positions of the shafts of the automatic transmission.

The parallel shaft speed change mechanism TM includes a first input shaft 1, a second input shaft 2, a countershaft 3, and an idle shaft 5, all of which are disposed parallel with one another. FIG. 4 shows the positions of these shafts in the housing, the centers of the shafts being indicated by corresponding alphanumeric marks, S1, S2, S3 and S5. FIGS. 3A and 3B show the rotational components of the speed change mechanism TM, which are arranged for mechanical transmission. FIG. 3A is a schematic sectional view showing the first input shaft 1 (S1), the second input shaft 2 (S2) and the countershaft 3 (S3), which are taken along line IIIA—IIIA in FIG. 4, while FIG. 3B is a schematic sectional view showing the first input shaft 1 (S1), the second input shaft 2 (S2) and the idle shaft 5 (S5), which are taken along line IIIB—IIIB in FIG. 4. Furthermore, FIG. 1 corresponds with FIG. 3A while FIG. 2 corresponds with FIG. 3B, all of which are sectional views of the speed change mechanism TM.

The first input shaft 1 is connected directly to the turbine of the torque converter TC and is supported rotatably by bearings 41a and 41b. The first input shaft 1 receives the drive power from the turbine and rotates with it at the same rotational speed. On this input shaft 1, from the side of the torque converter TC (i.e., the right side of the drawing), disposed are a FIFTH speed drive gear 25a, a FIFTH speed clutch 15, a FOURTH speed clutch 14, a FOURTH speed drive gear 24a, a reverse drive gear 26a, and a first connection gear 31. The FIFTH speed drive gear 25a is disposed rotatably on the first input shaft 1, and the FIFTH speed clutch 15, which is actuated hydraulically, engages with the FIFTH speed drive gear 25a to connect it rotationally to the first input shaft 1. The FOURTH speed drive gear 24a and the reverse drive gear 26a, which are coupled as one body, are disposed rotatably on the first input shaft 1, and the FOURTH speed clutch 14, which is actuated hydraulically, engages with these gears to connect them rotationally to the first input shaft 1. The first connection gear 31 is mounted on the first input shaft 1, at the left end thereof outside the bearing 41a, which supports the first input shaft 1 rotatably. In this condition, the first connection gear 31 and this end portion of the first input shaft 1 are supported only by this bearing 41a in cantilever.

The second input shaft 2 is also supported rotatably by bearings 42a and 42b. On this input shaft 2, from the right side of the drawing, disposed are a SECOND speed clutch 12, a SECOND speed drive gear 22a, a LOW drive gear 21a, a LOW clutch 11, a THIRD speed clutch 13, a THIRD speed drive gear 23a, and a fourth connection gear 34. The SECOND speed drive gear 22a, the LOW drive gear 21a and the THIRD speed drive gear 23a are each disposed rotatably on the second input shaft 2, and the SECOND speed clutch 12, the LOW clutch 11, or the THIRD speed clutch 13, which is actuated hydraulically, engages with the respective gear to connect it rotationally to the second input shaft 2. In addition, the fourth connection gear 34 is coupled to the second input shaft 2.

The idle shaft 5 including a second connection gear 32 and a third connection gear 33, which are formed as one body with the idle shaft 5, is supported rotatably by bearings 45a and 45b. The second connection gear 32 meshes with the first connection gear 31 while the third connection gear 33 meshes with the fourth connection gear 34. The first, second, third and fourth connection gears constitute a connection gear train 30, through which the rotation of the first input shaft 1 is transmitted continually to the second input shaft 2.

The countershaft 3 is supported rotatably by bearings 43a and 43b. On this shaft 3, from the right side of the drawing, disposed are the above mentioned last reduction drive gear 6a, a SECOND speed driven gear 22b, a LOW driven gear 21b, a FIFTH speed driven gear 25b, a THIRD speed driven gear 23b, a FOURTH speed driven gear 24b, a dog clutch 16, and a reverse driven gear 26c. The last reduction drive gear 6a, the SECOND speed driven gear 22b, the LOW driven gear 21b, the FIFTH speed driven gear 25b and the THIRD speed driven gear 23b are fixed on and rotate together with the countershaft 3 while the FOURTH speed driven gear 24b and the reverse driven gear 26c are each disposed rotatably on the countershaft 3. The dog clutch 16 is actuated axially in one direction to engage with the FOURTH speed driven gear 24b so as to connect it rotationally to the countershaft 3 or in the opposite direction to engage with the reverse driven gear 26c so as to connect it rotationally to the countershaft 3.

As shown in the drawings, the LOW drive gear 21a meshes with the LOW driven gear 21b; the SECOND speed drive gear 22a meshes with the SECOND speed driven gear 22b; the THIRD speed drive gear 23a meshes with the THIRD speed driven gear 23b; the FOURTH speed drive gear 24a meshes with the FOURTH speed driven gear 24b; and the FIFTH speed drive gear 25a meshes with the FIFTH speed driven gear 25b. In addition, the reverse drive gear 26a meshes with a reverse idler gear 26b (refer to FIG. 2), which then meshes with the reverse driven gear 26c.

Figure 1:
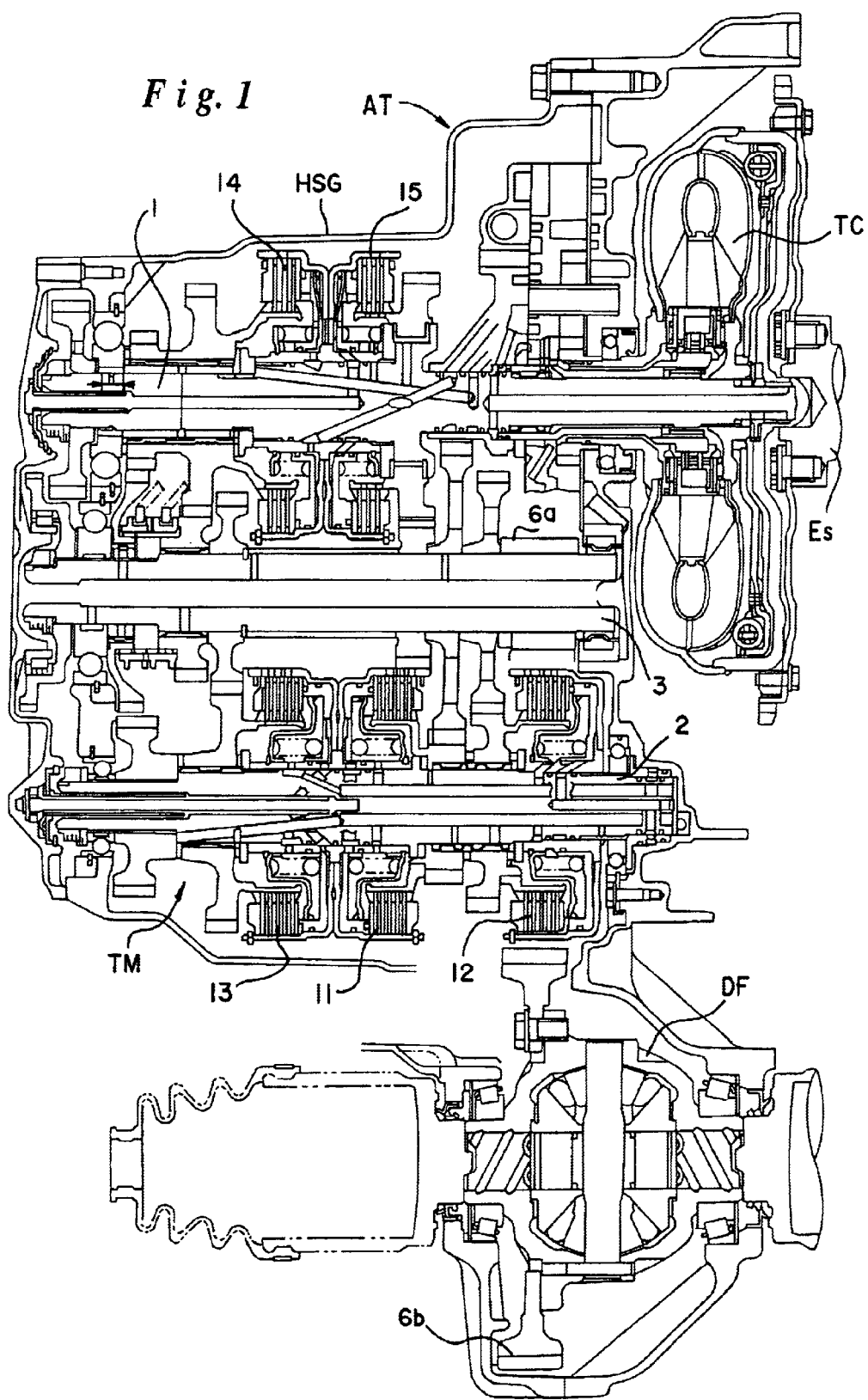
FIG. 1 is a sectional view of an automatic transmission whose speed change at the starting up of the vehicle is controlled by an engine-restart starting control system according to the present invention.
Figure 2:
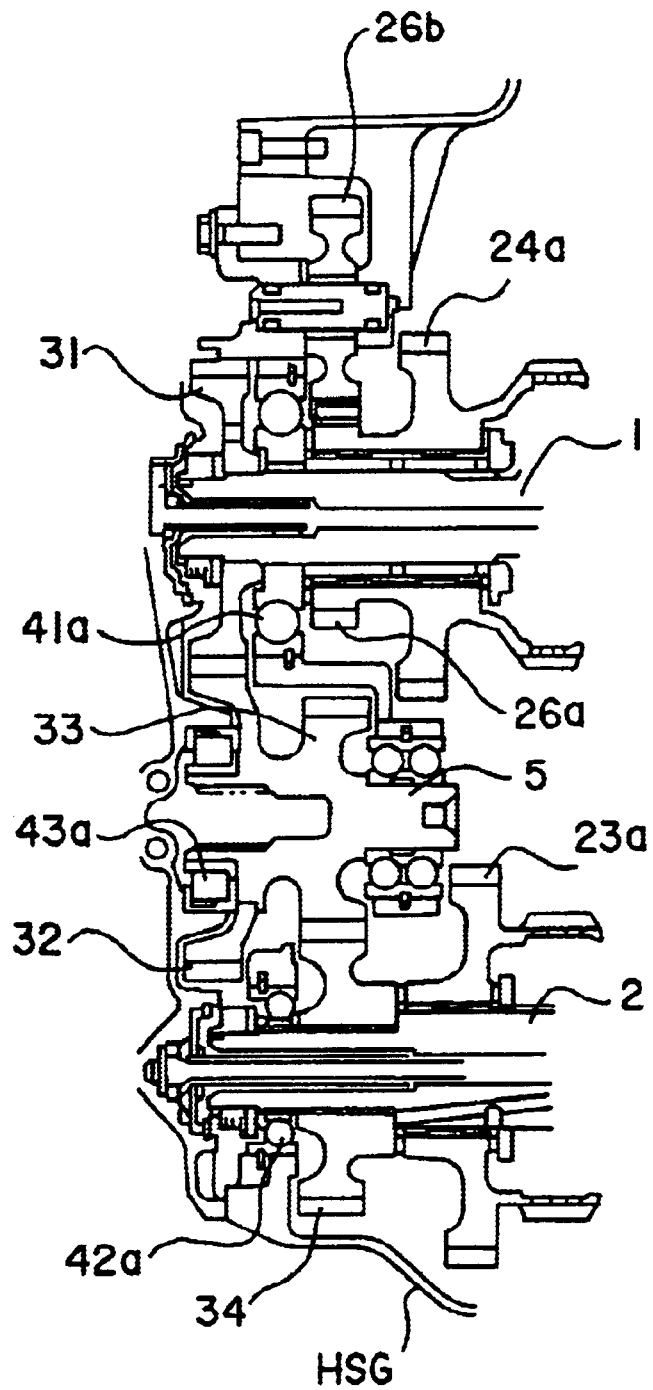
FIG. 2 is a partial sectional view of the automatic transmission.

The last reduction drive gear 6a meshes with the last reduction driven gear 6b (refer to FIG. 1, which shows that they are situated at the same position in the axial direction though the drawing does not show the actual condition that they mesh with each other). The rotation of the countershaft 3 is transmitted through the last reduction drive and driven gears 6a and 6b to the differential mechanism DF.

Now, a description is given of how each speed ratio of the automatic transmission AT is established and through which path the drive power is transmitted at each speed ratio. In this transmission AT, for establishing the forward drive range, the dog clutch 16 is shifted toward the right side of the drawing, where the dog clutch 16 engages with the FOURTH speed driven gear 24b to connect it rotationally to the countershaft 3. For the reverse drive range, the dog clutch 16 is shifted leftward, where the dog clutch 16 engages with the reverse driven gear 26c to connect it rotationally to the countershaft 3.

First, the establishment of each speed ratio of the forward drive range is described. The LOW ratio is established when the LOW clutch 11 is engaged. The rotational drive power which is input from the torque converter TC to the first input shaft 1 is transmitted through the connection gear train 30 to the second input shaft 2. Because the LOW clutch 11 is engaged, the LOW drive gear 21a which is driven at the same rotational speed as the second input shaft 2 drives the LOW driven gear 21b mounted on the countershaft 3. This drive power is then transmitted through the last reduction drive and driven gears 6a and 6b to the differential mechanism DF.

The SECOND speed ratio is established when the SECOND speed clutch 12 is engaged. The rotational drive power which is input from the torque converter TC to the first input shaft 1 is transmitted through the connection gear train 30 to the second input shaft 2. Because the SECOND speed clutch 12 is engaged, the SECOND speed drive gear 22a which is driven at the same rotational speed as the second input shaft 2 drives the SECOND speed driven gear 22b mounted on the countershaft 3. This drive power is then transmitted through the last reduction drive and driven gears 6a and 6b to the differential mechanism DF.

The THIRD speed ratio is established when the THIRD speed clutch 13 is engaged. The rotational drive power which is input from the torque converter TC to the first input shaft 1 is transmitted through the connection gear train 30 to the second input shaft 2. Because the THIRD speed clutch 13 is engaged, the THIRD speed drive gear 23a which is driven at the same rotational speed as the second input shaft 2 drives the THIRD speed driven gear 23b mounted on the countershaft 3. This drive power is then transmitted through the last reduction drive and driven gears 6a and 6b to the differential mechanism DF.

The FOURTH speed ratio is established when the FOURTH speed clutch 14 is engaged. The rotational drive power which is input from the torque converter TC to the first input shaft 1 is transmitted through the FOURTH speed clutch 14 to the FOURTH speed drive gear 24a, which drives the FOURTH speed driven gear 24b. Because the dog clutch 16 is kept engaged with the FOURTH speed driven gear 24b for the forward drive range, the countershaft 3 is driven. This drive power is then transmitted through the last reduction drive and driven gears 6a and 6b to the differential mechanism DF.

The FIFTH speed ratio is established when the FIFTH speed clutch 15 is engaged. The rotational drive power which is input from the torque converter TC to the first input shaft 1 is transmitted through the FIFTH speed clutch 15 to the FIFTH speed drive gear 25a, which drives the FIFTH speed driven gear 25b. The FIFTH speed driven gear 25b, which is fixed to the countershaft 3, in turn, drives the countershaft 3. This drive power is then transmitted through the last reduction drive and driven gears 6a and 6b to the differential mechanism DF.

The reverse drive range is established when the FOURTH speed clutch 14 is engaged, and the dog clutch 16 is shifted leftward. The rotational drive power which is input from the torque converter TC to the first input shaft 1 is transmitted through the FOURTH speed clutch 14 to the reverse drive gear 26a, which, in turn, drives the reverse driven gear 26c through the reverse idler gear 26b. Because the dog clutch 16 is engaged with the reverse driven gear 26c for the reverse drive range, the countershaft 3 is driven. This drive power is then transmitted through the last reduction drive and driven gears 6a and 6b to the differential mechanism DF. It should be noted that, as described in this paragraph, the FOURTH speed clutch 14 is used as a reverse clutch for the establishment of the reverse drive range in this transmission in addition to the establishment of the above described FOURTH speed ratio.

Now, in reference to FIGS. 5~10, a description is made of a hydraulic circuit which constitutes a speed change control system for this automatic transmission AT. FIGS. 6~10 show five sections of the hydraulic circuit at an enlarged scale, which sections are partitioned by alternate long and short dash lines A~E, respectively, in FIG. 5. The points of the oil passages shown open in the hydraulic circuit diagram are connected to a drainage system.

This hydraulic circuit includes an oil pump OP being driven by the engine to supply working oil from an oil tank OT to an oil passage 100. This oil passage 100 is connected through a branch passage 100a to a main regulator valve 50, where the pressure of the oil in the oil passages 100 and 100a is adjusted to a predetermined line pressure PL. This line pressure PL is then supplied through another branch passage 100b to first~fifth on/off solenoid valves 81~85 and to a first linear solenoid valve 86.

Surplus oil from the oil used for the generation of the line pressure PL at the main regulator valve 50 is led to an oil passage 101 and then to another oil passage 102. The oil flowing to the passage 101 is regulated by a lock-up shift valve 51, a lock-up control valve 52 and a torque converter check valve 53, and the oil is used for actuating and locking up the torque converter TC. After being used for the control of the torque converter TC, this oil returns through an oil cooler 54 to the oil tank OT. In this description, no explanation is given of the control of the torque converter TC because the control of the torque converter is not related directly to the present invention. The pressure of the oil supplied to the passage 102 is adjusted by a lubrication relief valve 55, and this oil is used for lubricating various parts of the transmission.

Figure 5:
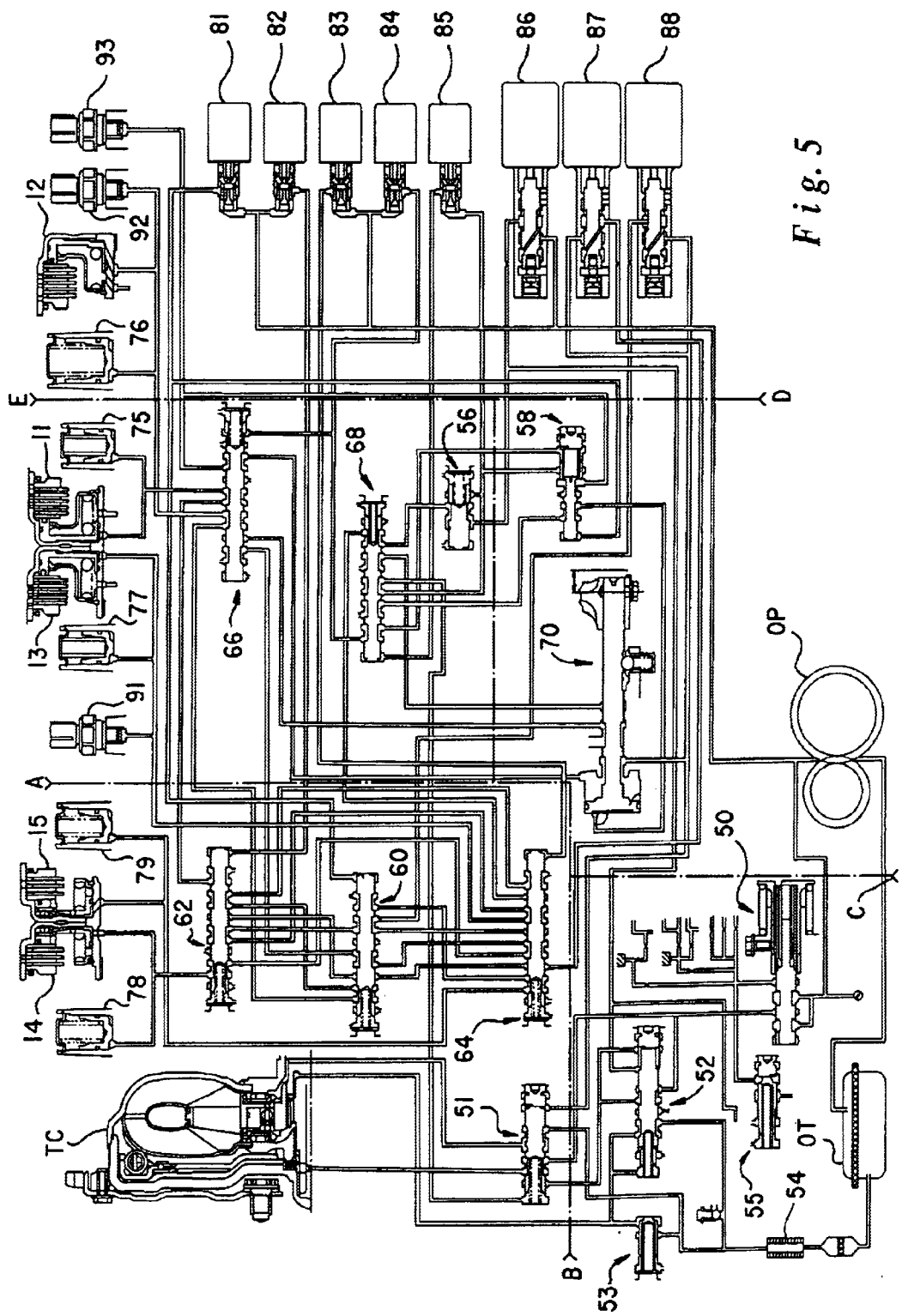
FIG. 5 is a hydraulic circuit diagram describing the construction of the engine-restart starting control system.
Figure 6:
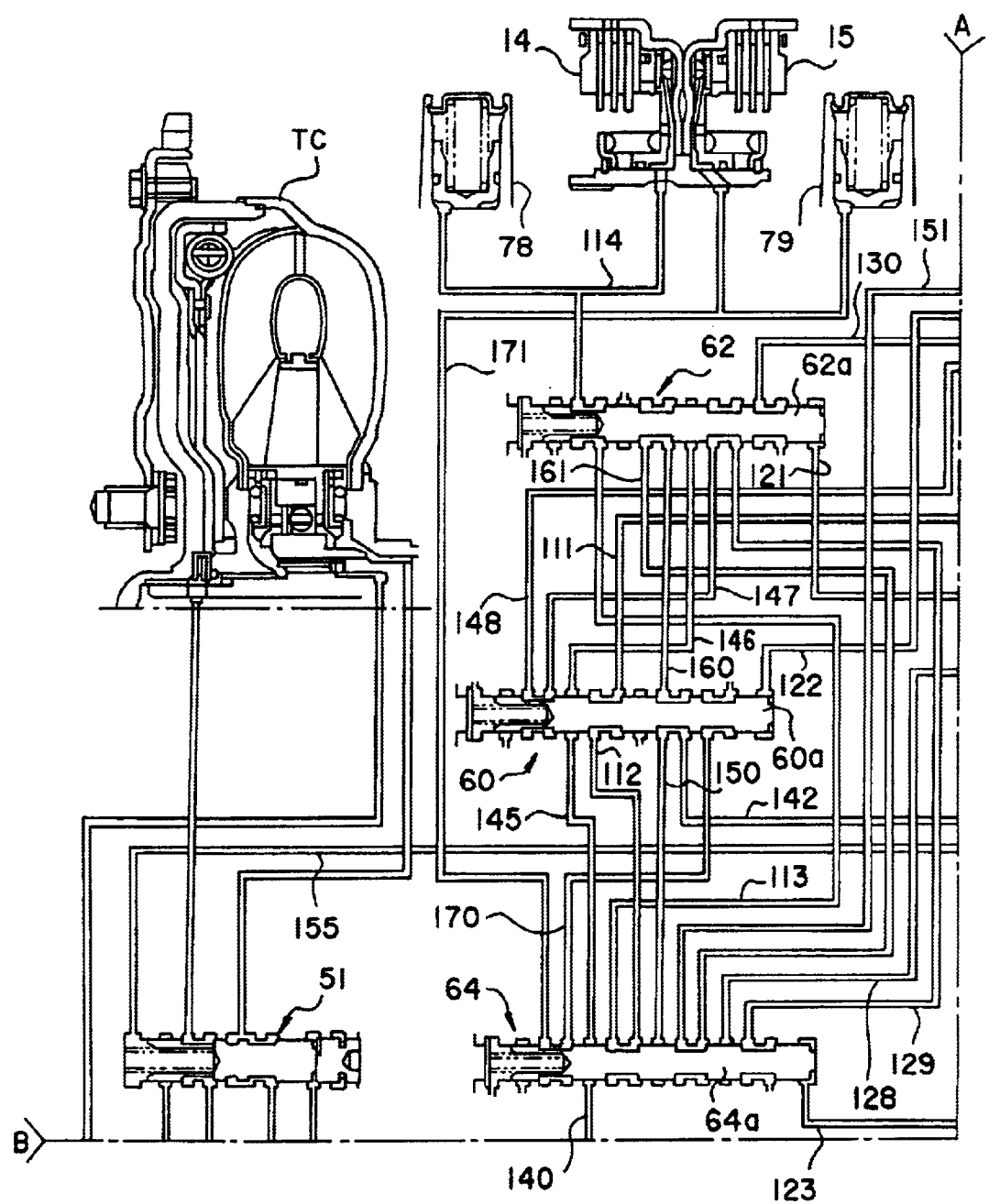
FIGS. 6~10 are diagrams, each showing part of the diagram of FIG. 5, respectively, in enlargement.
Figure 7:
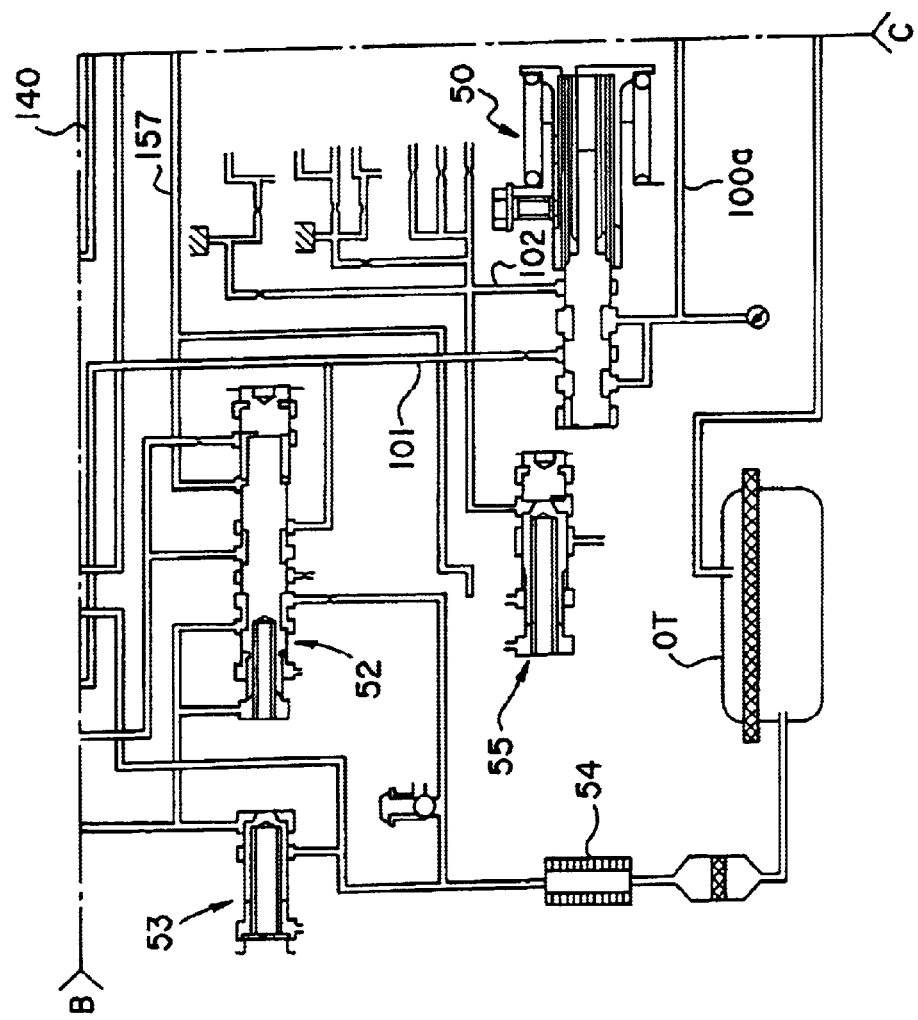
Figure 8:
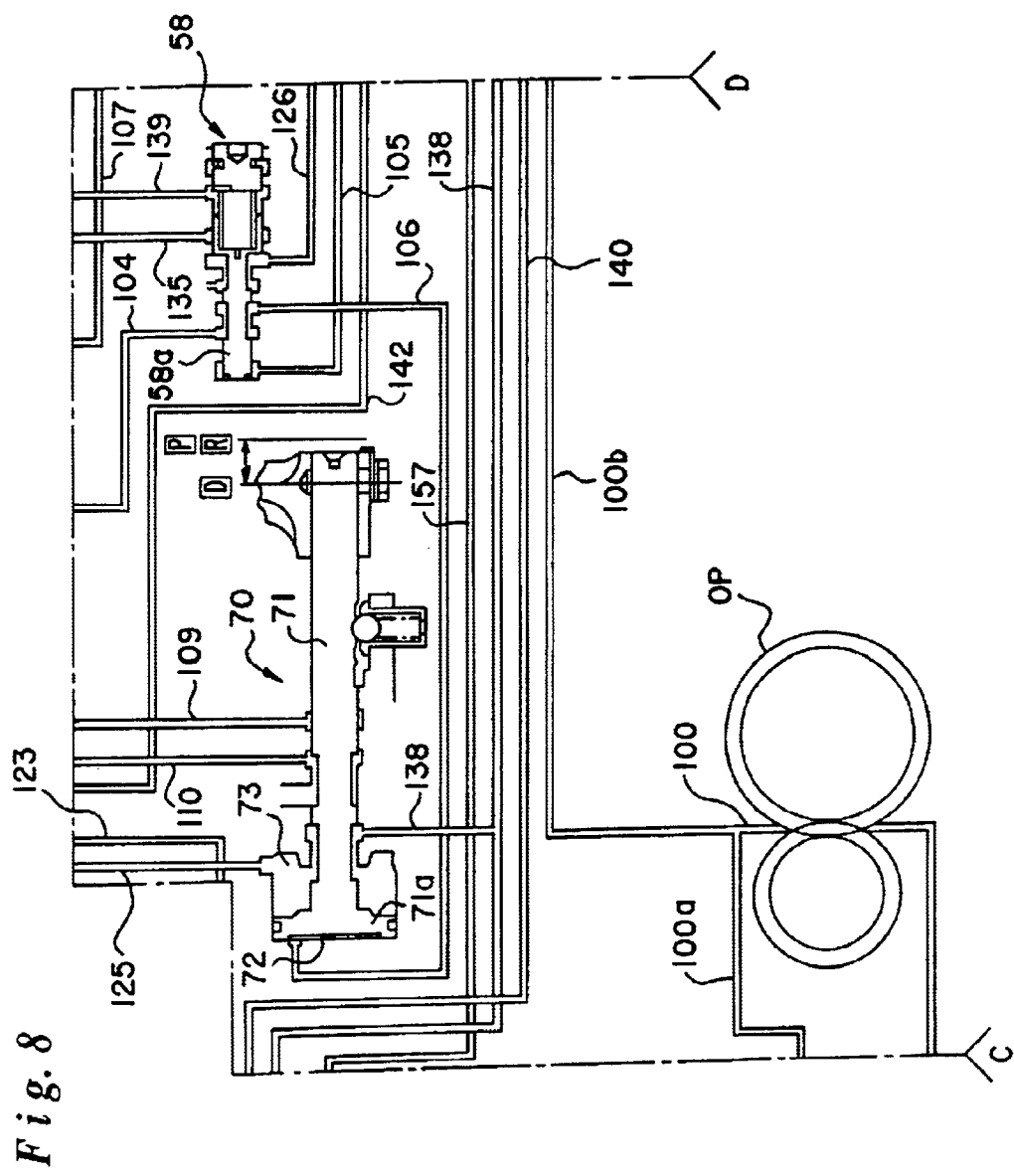
Figure 9:
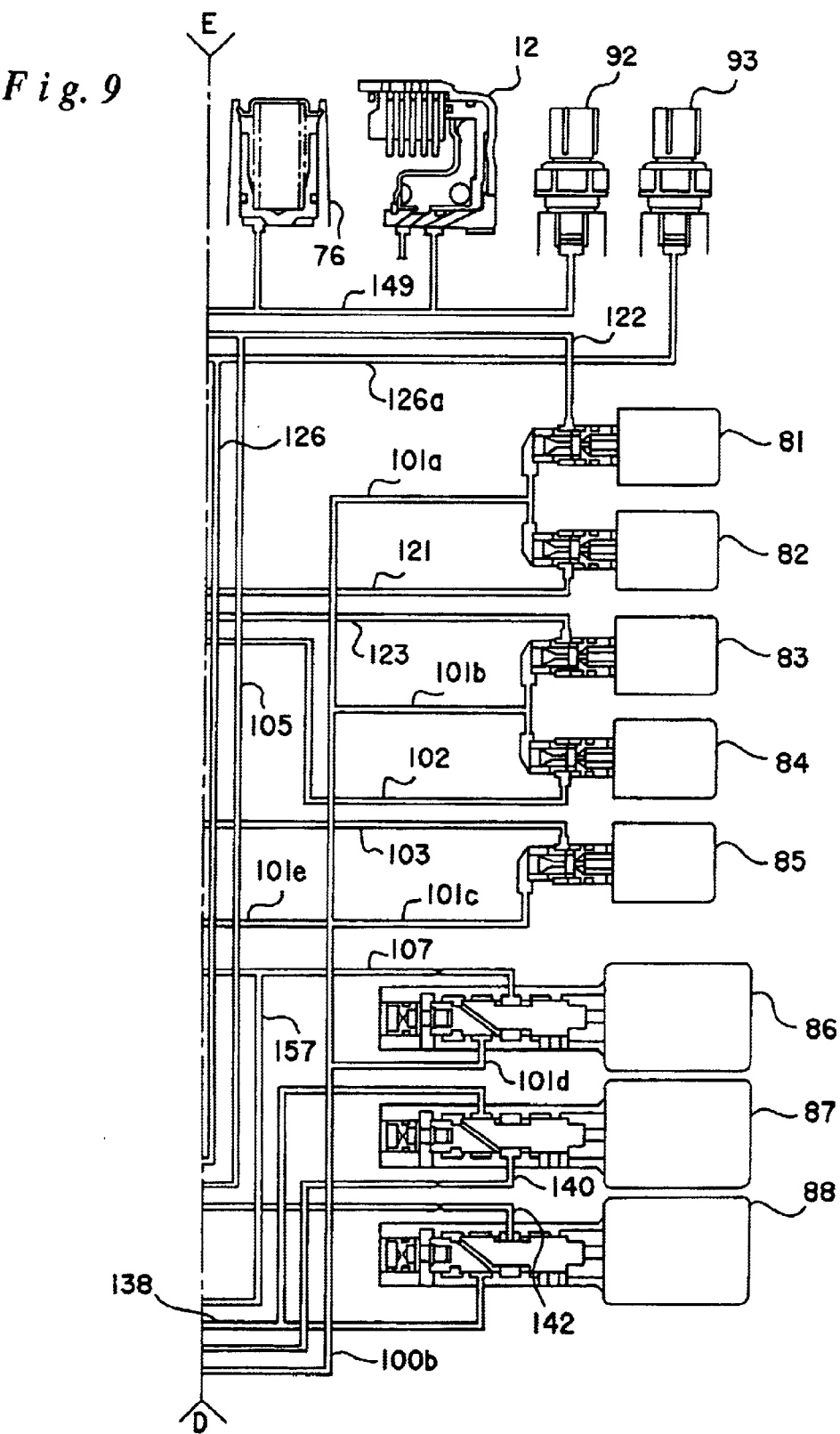
Figure 10:
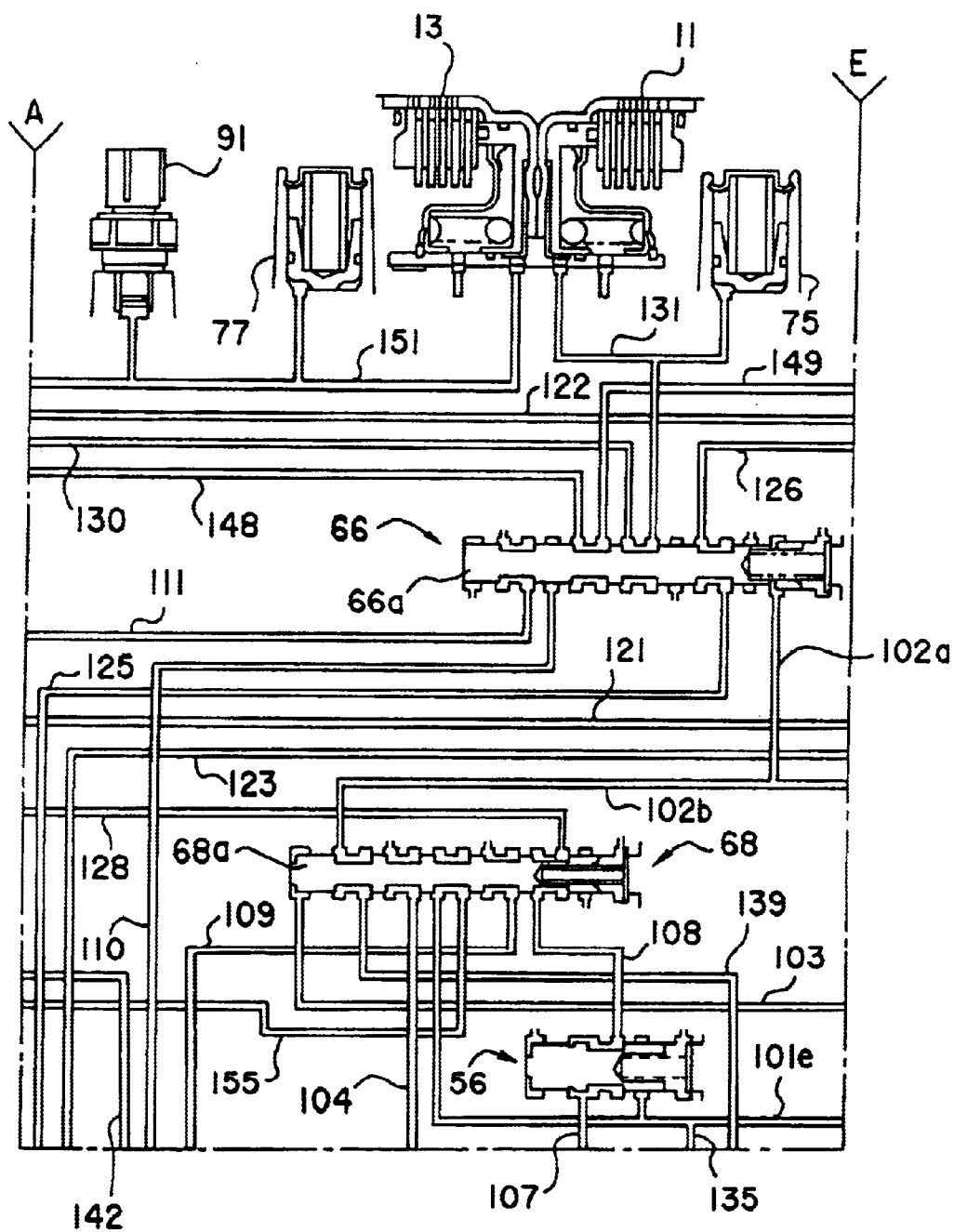

As shown in FIG. 5, a LOW accumulator 75, a SECOND accumulator 76, a THIRD accumulator 77, a FOURTH accumulator 78 and a FIFTH accumulator 79 are connected through oil passages, respectively, to the LOW clutch 11, the SECOND speed clutch 12, the THIRD speed clutch 13, the FOURTH speed clutch 14 and the FIFTH speed clutch 15, which constitute the automatic transmission AT as described above. This hydraulic circuit is also equipped with a forward/reverse selection hydraulic servomechanism 70 to operate the dog clutch 16.

Furthermore, as shown in the figure, a first shift valve 60, a second shift valve 62, a third shift valve 64, a fourth shift valve 66, a fifth shift valve 68, a CPB valve 56 and a D inhibitor valve 58 are provided to control the hydraulic pressure supplied to these clutches 11~15 and to the forward/reverse selection hydraulic servomechanism 70. To control the actuation of these valves and to control the hydraulic pressure supplied to the clutches, etc., the above mentioned first~fifth on/off solenoid valves 81~85 and the first~third linear solenoid valves 86~88 are arranged appropriately.

Now, the operation of this hydraulic circuit is described for each speed ratio, which is established when the condition of the first~fifth on/off solenoid valves 81~85 is set as listed in Table 1 below. The first~fifth on/off solenoid valves 81~85 are normally closed valves, so each valve opens to generate a signal pressure to actuates other respective valves when its solenoid is electrically energized (i.e., while it is turned ON).

TABLE 1

| | | solenoid valves | | | | |
|---|---|---|---|---|---|---|
| | 81 | 82 | 83 | 84 | 85 | Mode |
| R | X | X | X | ○ | ○ | Reverse |
| N | ○ | ○ | ○ | ○ | ○ | First NEUTRAL |
| | ○ | X | X | ○ | X | Second NEUTRAL |
| D | ○ | ○ | ○ | ○ | X | F/S 2ND |
| | X | ○ | ○ | X | X | IN GEAR |
| | ○ | ○ | ○ | X | X | LOW |
| | X | ○ | ○ | X | ○/X | 1-2-3 |
| | X | ○ | X | X | ○/X | 2ND |
| | X | X | X | X | ○/X | 3RD |
| | X | X | ○ | X | ○/X | 2-3-4 |
| | ○ | X | ○ | X | ○/X | 4TH |

TABLE 1-continued

| | solenoid valves | | | | |
|---|---|---|---|---|---|
| 81 | 82 | 83 | 84 | 85 | Mode |
| ○ | X | X | X | ○/X | 4-5 |
| ○ | ○ | X | X | ○/X | 5TH |

Note: "○"and "X" in the table represent the turning on and off of the solenoids, respectively.

At first, a description is given for the establishment of the REVERSE speed ratio. As shown in Table 1, the first~third on/off solenoid valves 81~83 are turned off and are closed while the fourth and fifth on/off solenoid valves 84 and 85 are turned on and are opened. In this condition, the line pressure PL which is supplied to the fourth and fifth on/off solenoid valves 84 and 85 through oil passages 101b and 101c that branch from the oil passage 100b is supplied to oil passages 102 and 103. The line pressure PL in the passage 102 acts on the right end flange portion of the fourth shift valve 66 through an oil passage 102a and shifts the spool 66a of the valve rightward (this action results in a condition opposite to that shown in the figure). The line pressure PL in the passage 103 acts on the left end of the fifth shift valve 68 and shifts the spool 68a of the valve rightward (this results in a condition opposite to that shown in the figure). As a result, an oil passage 102b that is branched from the passage 102 is blocked at the fifth shift valve 68.

On the other hand, the line pressure PL being supplied to the fifth shift valve 68 through an oil passage 101e that is branched from the passage 100b is supplied through a groove provided on the spool 68a of the fifth shift valve 68 to an oil passage 104, which leads to the D inhibitor valve 58. In this condition, because an oil passage 105 connected to the left end of the D inhibitor valve 58 is connected to a drain at the first on/off solenoid valve 81, the spool 58a of the D inhibitor valve 58 is positioned to the left side of the valve (this position of the spool 58a is hereinafter referred to as "reverse drive position"), so the passage 104 is connected with a passage 106 which is connected to the left side oil chamber 72 of the forward/reverse selection hydraulic servomechanism 70. Therefore, the line pressure PL being supplied into the left side oil chamber 72 pushes rightward the piston portion 71a of a rod 71 which is provided in the forward/reverse selection hydraulic servomechanism 70. When the rod 71, which is provided with a shift fork to operate the dog clutch 16, is shifted rightward, the dog clutch 16 engages with the reverse driven gear 26c to connect it rotationally to the countershaft 3.

As mentioned previously, the reverse drive range is established when the dog clutch 16 is engaged with the reverse driven gear 26c and the FOURTH speed clutch 14 is engaged. The engagement of the FOURTH speed clutch 14 is actuated by the first linear solenoid valve 86, to which the line pressure PL is supplied through an oil passage 101d. At the first linear solenoid valve 86, the supply of the line pressure to another oil passage 107 is adjusted by means of electrical control of the current flowing through the solenoid of the valve (pressure adjustment control).

This passage 107 is connected with another oil passage 108 through the CPB valve 56, and this oil passage 108 is connected with another oil passage 109 through a passage which is created when the spool 68a of the fifth shift valve 68 is shifted rightward. This oil passage 109 is then connected with another oil passage 110 through a passage which is created by a groove of the rod 71 of the forward/reverse selection hydraulic servomechanism 70 when the rod is shifted rightward. This oil passage 110 is then connected with another oil passage 111 through a passage which is created when the spool 66a of the fourth shift valve 66 is shifted rightward. Then, this oil passage 111 is connected with another oil passage 112 through a passage which is created when the spool 60a of the first shift valve 60 is shifted rightward. This oil passage 112 is then connected with another oil passage 113 through a passage which is created when the spool 64a of the third shift valve 64 is shifted rightward. Furthermore, this oil passage 113 is connected with another oil passage 114 through a passage which is created when the spool 62a of the second shift valve 62 is shifted rightward. This oil passage 114 is then connected to the actuation oil chamber of the FOURTH speed clutch 14 and to the FOURTH accumulator 78. In this arrangement, the engagement of the FOURTH speed clutch 14 is controlled by the first linear solenoid valve 86 for setting the REVERSE speed ratio.

Now, the control for establishing the neutral range is described. As shown in Table 1, the neutral range comprises First and Second NEUTRAL modes. The First NEUTRAL mode takes place when the neutral range (N range) or the reverse drive range (R range) is selected while the vehicle is driving at a speed greater than a predetermined speed (e.g., 10 km/h) in the forward drive range (D range). The First NEUTRAL mode functions as a reverse inhibitor to prevent the transmission from shifting to the REVERSE speed ratio in such a condition. The Second NEUTRAL mode takes place when the transmission shifts from the reverse drive range to the neutral range and from the forward drive range to the neutral range. Moreover, when the transmission shifts from the reverse drive range through the Second NEUTRAL mode to the forward drive range, the transmission goes through the In-gear mode listed in Table 1. On the other hand, if the transmission, after having shifted from the reverse drive range to the Second NEUTRAL mode, is operated to shift from the Second NEUTRAL mode to the reverse drive range, the transmission shifts directly to the reverse drive range without going through the In-gear mode. In the same way, the Second NEUTRAL mode takes place when the transmission shifts from the forward drive range to the reverse drive range, so the reverse drive range is established after the D inhibitor valve 58 is actuated to a reverse mode. However, if the transmission, after having shifted from the forward drive range to the Second NEUTRAL mode, is operated to shift from the Second NEUTRAL mode to the forward drive range, the transmission shifts directly to the forward drive range without any mode change of the D inhibitor valve 58.

In the First NEUTRAL mode, all the first~fifth on/off solenoid valves 81~85 are turned on and are open. Therefore, when the mode of the transmission is changing from the REVERSE speed ratio or reverse drive range to the First NEUTRAL mode, the first~third on/off solenoid valves 81~83, which have been closed for setting the reverse drive range, are now opened, and the supply of hydraulic oil through these valves starts. At first, the line pressure PL which is supplied to the first on/off solenoid valve 81 through the oil passage 101a is now led to an oil passage 122 which is connected to the right end of the first shift valve 60. With this supply of the line pressure PL, the spool 60a of the first shift valve 60 is shifted leftward. As the oil passage 122 is connected also with the oil passage 105, the line pressure is supplied also to the left end of the D inhibitor valve 58 through the passage 105. As a result, the spool 58a of the D inhibitor valve shifts rightward (this position of the spool 58a is hereinafter referred to as "forward drive position"). In this condition, the passage 106 which is connected to the left side oil chamber 72 of the forward/reverse selection hydraulic servomechanism 70 is connected to a drain through the D inhibitor valve 58, so the hydraulic oil in the left side oil chamber 72 is drained.

In the condition where the spool 58a of the D inhibitor valve 58 is shifted to the right side thereof, the line pressure PL is supplied into the D inhibitor valve 58 through the oil passages 101e and 135, and this pressure acts on the spool 58a to maintain the spool on the right side of the valve even after the line pressure supplied from the oil passage 105 is terminated. To the D inhibitor valve 58, another oil passage 139 is arranged such that the line pressure led through this passage acts on the spool 58a to shift the spool leftward. Therefore, only when the line pressure is led through this oil passage 139, the spool 58a of the D inhibitor valve 58 can shift leftward. In the condition where the spool 58a is shifted rightward, the line pressure PL is supplied to an oil passage 126 whose branching passage 126a leads the pressure to a hydraulic switch 93. Therefore, the line pressure PL supplied to the oil passage 126 is detected by the hydraulic switch 93.

Also, the line pressure supplied through the oil passage 101a to the second on/off solenoid valve 82 is now led to the oil passage 121 which is connected to the right end of the second shift valve 62. With this supply of hydraulic pressure, the spool 62a of the second shift valve 62 shifts leftward. Furthermore, the line pressure supplied through the oil passage 101b to the third on/off solenoid valve 83 is led to the oil passage 123 which is connected to the right end of the third shift valve 64. With this pressure, the spool 64a of the third shift valve 64 shifts leftward. As a result, the oil passage 114 connected to the oil chamber of the FOURTH speed clutch 14 is now connected to a drain through a groove provided on the spool of the second shift valve 62, and the FOURTH speed clutch 14 is released to set a neutral condition.

In this condition, as mentioned previously, because the spool 58a of the D inhibitor valve 58 is maintained to the right side thereof at the position for the forward drive, the passage 106 connected to the left side oil chamber 72 of the forward/reverse selection hydraulic servomechanism 70 is in fluid communication to a drain at the D inhibitor valve 58. On the other hand, the oil passage 125 connected to the right side oil chamber 73 of the forward/reverse selection hydraulic servomechanism 70 is in fluid communication to a drain through the fourth shift valve 66, whose spool 66a is shifted on the right side thereof. As a result, in the First NEUTRAL mode, no axial force acts on the rod 71 of the forward/reverse selection hydraulic servomechanism 70, so the rod 71 is kept in a standby condition.

In the Second NEUTRAL mode, the first and fourth on/off solenoid valves 81 and 84 are turned on and are open while the second, third and fifth on/off solenoid valves 82, 83 and 85 are turned off and are closed. In response to this actuation condition of the solenoid valves, the shift valves are set as follows: the spool 60a of the first shift valve 60 is shifted leftward, the spool 62a of the second shift valve 62 is shifted rightward, the spool 64a of the third shift valve 64 is shifted rightward, the spool 66a of the fourth shift valve 66 is shifted rightward, and the spool 68a of the fifth shift valve 68 is shifted leftward.

Now, the line pressure is supplied from the fourth on/off solenoid valve 84 through an oil passage 102b and the fourth shift valve 66 to an oil passage 139 which leads to the D inhibitor valve 58. As a result, the spool 58a of the D inhibitor valve 58 is shifted leftward to the reverse drive position. In this condition, as the spool 66a of the fourth shift valve 66 is shifted rightward, the oil passage 125 connected to the right side oil chamber 73 of the forward/reverse selection hydraulic servomechanism 70 is connected to a drain at the fourth shift valve 66. On the other hand, the passage 106 connected to the left side oil chamber 72 of the forward/reverse selection hydraulic servomechanism 70 is connected to a drain through the D inhibitor valve 58 and the fifth shift valve 68. As a result, without any axially acting force, the rod 71 of the forward/reverse selection hydraulic servomechanism 70 remains in the same condition which has existed before the transmission takes this Second NEUTRAL mode. No force is generated in the axial direction until the spool 68a of the fifth shift valve 68 is shifted rightward.

Now, each mode for the forward drive range (D range) is described. The In-gear mode takes place, for example, when the shift lever is manipulated from the N position to the D position to engage gears, and the In-gear mode prepares the transmission to start the engagement of the LOW clutch 11. In this mode, the second and third on/off solenoid valves 82 and 83 are turned on and are open while the first, fourth and fifth on/off solenoid valves 81, 84 and 85 are turned off and are closed. In response to this actuation condition of the solenoid valves, the shift valves are set as follows: the spool 60a of the first shift valve 60 is shifted rightward, the spool 62a of the second shift valve 62 is shifted leftward, the spool 64a of the third shift valve 64 is shifted leftward, the spool 66a of the fourth shift valve 66 is shifted leftward, and the spool 68a of the fifth shift valve 68 is shifted leftward.

In the In-gear mode, the LOW clutch 11 is controlled to engage gradually by the first linear solenoid valve 86. The hydraulic pressure adjusted by the first linear solenoid valve 86 is supplied to the oil passage 107 which is connected with the oil passage 108 through the CPB valve 56. This oil passage 108 is connected with another oil passage 128 through a passage which is created when the spool 68a of the fifth shift valve 68 is shifted leftward. The oil passage 128 is then connected with another oil passage 129 through a passage which is created when the spool 64a of the third shift valve 64 is shifted leftward. Then, the oil passage 129 is connected with another oil passage 130 through a passage which is created when the spool 62a of the second shift valve 62 is shifted leftward. This oil passage 130 is then connected with another oil passage 131 through a passage which is created when the spool 66a of the fourth shift valve 66 is shifted leftward. This oil passage 131 is then connected to the oil chamber of the LOW clutch 11 and to the LOW accumulator 75. In this arrangement, the LOW clutch 11 is engaged gradually in correspondence to the activation of the first linear solenoid valve 86.

In the In-gear mode, the oil passage 125 connected to the right side oil chamber 73 of the forward/reverse selection hydraulic servomechanism 70 is connected with the oil passage 126 through a passage which is created by the leftward shift of the spool 66a of the fourth shift valve 66. This oil passage 126 is then connected with the oil passage 135 which leads to the oil passage 101e, through a passage created by the rightward shift of the spool 58a of the D inhibitor valve 58 (placed at the forward drive position). On the other hand, the passage 106 connected to the left side oil chamber 72 of the forward/reverse selection hydraulic servomechanism 70 is connected through the D inhibitor valve 58 with the oil passage 104 which is drained at the fifth shift valve 68 whose spool 68a is shifted on the left side thereof. As a result, the line pressure PL being supplied into the right side oil chamber 73 of the forward/reverse selection hydraulic servomechanism 70 acts on the rod 71 and pushes it leftward. Therefore, in the In-gear mode, the rod 71 of the forward/reverse selection hydraulic servomechanism 70 is shifted leftward as shown in the figure, so the dog clutch 16 shifts to the D range position and engages with the FOURTH speed driven gear 24b to connect it rotationally to the countershaft 3.

When the dog clutch 16 is shifted to the D range position (i.e., set for the forward drive range), the line pressure is led through the oil passage 126a branching from the passage 126 to the hydraulic switch 93, turning this switch 93 on. In other words, the hydraulic switch 93 is used to detect whether the line pressure to set the D range is actually being supplied into the right side oil chamber 73 of the forward/reverse selection hydraulic servomechanism 70 or not.

Now, a description is given of the LOW mode. In the LOW mode, which is set, for example, to start the vehicle when the D range is selected, the first~third on/off solenoid valves 81~83 are turned on and are opened while the fourth and fifth on/off solenoid valves 84 and 85 are turned off and are closed. In this condition, the spool 60a of the first shift valve 60 is shifted to the left side, the spool 62a of the second shift valve 62 is shifted to the left side, the spool 64a of the third shift valve 64 is shifted to the left side, the spool 66a of the fourth shift valve 66 is shifted to the left side, and the spool 68a of the fifth shift valve 68 is shifted to the left side.

The LOW mode differs from the In-gear mode only in the actuation of the first on/off solenoid valve 81. In the LOW mode, the first on/off solenoid valve 81 is turned on, so the spool 60a of the first shift valve 60 is shifted leftward. Then, the line pressure PL being supplied from the first on/off solenoid valve 81 to the oil passage 122 is led through the oil passage 105 to the left end of the D inhibitor valve 58, so the spool 58a of the D inhibitor valve 58 is shifted rightward. In this condition, the oil passage 135 branching from the oil passage 101e, to which the line pressure PL is being supplied, is connected with the oil passage 126 through the D inhibitor valve 58, so the line pressure PL is now supplied to the D inhibitor valve 58 through the oil passage 126.

In the condition where the oil passage 135 is connected with the oil passage 126, the spool 58a of the D inhibitor valve 58 is pushed rightward by the line pressure PL being supplied, so the spool 58a remains on the right side of the valve even after the line pressure supplied through the oil passage 105 is terminated. This spool 58a remains on the right side unless the line pressure from the oil passage 139 acts on the spool 58a and pushes leftward, which pressure is only available when the fourth on/off solenoid valve 84 is turned on to shift the spool 68a of the fifth shift valve 68 rightward. Therefore, once the spool 58a of the D inhibitor valve 58 is shifted rightward, it remains on the right side until the fourth on/off solenoid valve 84 is turned on. Here, it can be understood clearly from Table 1 that the fourth on/off solenoid valve 84 is turned off for the D range (except for the F/S SECOND mode), so the spool 58a of the D inhibitor valve 58 remains at the forward drive position.

Now, the oil passage 126 is connected with the oil passage 125 through a passage created by the leftward shift of the spool 66a of the fourth shift valve 66, so the line pressure PL is supplied through the oil passage 125 to the right side oil chamber 73 of the forward/reverse selection hydraulic servomechanism 70. This supply of the line pressure into the right side oil chamber 73 is detected by the hydraulic switch 93 while the rod 71 in the servomechanism is being shifted leftward. By this movement of the rod, the dog clutch 16 is shifted to the D range position and engaged with the FOURTH speed driven gear 24b, and as a result, this driven gear is connected rotationally to the countershaft 3. In the condition where the rod 71 is on the left side, the right side oil chamber 73 is connected to an oil passage 138 through which the line pressure PL is supplied to the second and third linear solenoid valves 87 and 88. Now, the line pressure PL is adjustable with the second and third linear solenoid valves 87 and 88, and this adjusted pressure can be supplied as control pressures to oil passages 140 and 142, respectively. However, no control pressure is output from these linear solenoid valves 87 and 88 in the LOW mode.

In the LOW mode, the control pressure being supplied from the first linear solenoid valve 86 to the oil passage 107 is led to the LOW clutch 11 in the same way as in the In-gear mode. Therefore, the engagement of the LOW clutch 11 is controlled in correspondence to the actuation of the first linear solenoid valve 86.

Now, a description is given of the 1-2-3 mode. This mode is set to shift the speed ratio of the transmission among the FIRST (LOW), SECOND, and THIRD speed ratios, i.e., to control the transition of speed ratio change. In this mode, the second and third on/off solenoid valves 82 and 83 are turned on and are opened while the first and fourth on/off solenoid valves 81 and 84 are turned off and are closed. The fifth on/off solenoid valve 85 is turned off when the FIRST speed ratio is established, and it is turned on or off in lock-up clutch actuation control (no description is provided on this control because it is not relevant to the present invention) when the second or THIRD speed ratio is established. In the 1-2-3 mode, the spool 60a of the first shift valve 60 is shifted rightward, the spool 62a of the second shift valve 62 is shifted leftward, the spool 64a of the third shift valve 64 is shifted leftward, and the spool 66a of the fourth shift valve 66 is shifted leftward.

As the fourth on/off solenoid valve 84 is turned off, the spool 58a of the D inhibitor valve 58 is maintained to the right side. In this condition, the line pressure PL is supplied to the right side oil chamber 73 of the forward/reverse selection hydraulic servomechanism 70, and this supply of the line pressure to the right side oil chamber 73 is detected by the hydraulic switch 93. As a result, the dog clutch 16 is maintained at the D range position. In addition, the line pressure PL is supplied through the oil passage 138 to the second and third linear solenoid valves 87 and 88.

In this mode, the engagement of the LOW clutch 11, the SECOND speed clutch 12 or the THIRD speed clutch 13 is controlled in correspondence to the actuation of the first, second and third linear solenoid valve 86, 87 and 88. The control pressure being supplied from the first linear solenoid valve 86 to the oil passage 107 is led to the oil passage 108 through the CPB valve 56. This oil passage 108 is connected with the oil passage 128 through the fifth shift valve 68, and this oil passage 128 is connected with the oil passage 129 through the third shift valve 64. Then, this oil passage 129 is connected with the oil passage 130 through the second shift valve 62, and this oil passage 130 is connected with the oil passage 131 through the fourth shift valve 66. This oil passage 131 is then connected to the LOW clutch 11. In this condition, the engagement of the LOW clutch 11 is controlled by means of the control pressure supplied from the first linear solenoid valve 86.

The primary pressure of the second linear solenoid valve 87 is the pressure supplied through the oil passage 138, which pressure is supplied only when the forward/reverse selection hydraulic servomechanism 70 is set at the D range position. This primary pressure is adjusted by the second linear solenoid valve 87 to a control pressure which is supplied to an oil passage 140. In this present condition, this oil passage 140 is connected through the third shift valve 64 with an oil passage 145, which is connected with an oil passage 146 through the first shift valve 60. This oil passage 146 is then connected with another oil passage 147 through the second shift valve 62, and this oil passage 147 is then connected with another oil passage 148 through the first shift valve 60. Then, this oil passage 148 is connected with another oil passage 149 through the fourth shift valve 66, and this oil passage 149 is connected to the SECOND speed clutch 12, a hydraulic switch 92 and the SECOND accumulator 76. In this arrangement, the control pressure from the second linear solenoid valve 87 is utilized for the engagement control of the SECOND speed clutch 12.

In this way, the hydraulic pressure generated only under the condition that the forward/reverse selection hydraulic servomechanism 70 is at the D range position is supplied as primary pressure to the second linear solenoid valve 87. Then, the supply of this pressure is detected by the hydraulic switch 92. In other words, the hydraulic switch 92 is used to confirm that the forward/reverse selection hydraulic servomechanism 70 is set at the D range position.

The control pressure generated at the third linear solenoid valve 88 is supplied to the oil passage 142 which is connected with another oil passage 150 through the first shift valve 60. This oil passage 150 is connected through the third shift valve 64 with another oil passage 151 which is connected to the THIRD speed clutch 13 and the THIRD accumulator 77. As a result, the control pressure form the third linear solenoid valve 88 is utilized for the engagement control of the THIRD speed clutch 13.

Now, a description is given of the SECOND mode, which is set for the engagement of the SECOND speed clutch 12. In this mode, the second on/off solenoid valve 82 is turned on and is opened while the first, third and fourth on/off solenoid valves 81, 83 and 84 are turned off and are closed. The fifth on/off solenoid valve 85 is turned on or off depending upon the condition of the lock-up clutch actuation control. In this condition, the spool 60a of the first shift valve 60 is shifted rightward, the spool 62a of the second shift valve 62 is shifted leftward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. In this condition, the line pressure PL is supplied through the oil passage 138 to the second and third linear solenoid valves 87 and 88.

In this mode, the engagement of the SECOND speed clutch 12 is controlled by the control pressure supplied from the second linear solenoid valve 87 to the oil passage 140. This oil passage 140 is connected through the third shift valve 64 with the oil passage 145, which is connected with the oil passage 146 through the first shift valve 60. This oil passage 146 is then connected with the oil passage 147 through the second shift valve 62, and this oil passage 147 is connected with the oil passage 148 through the first shift valve 60. Furthermore, this oil passage 148 is connected with the oil passage 149 through the fourth shift valve 66, and this oil passage 149 is connected to the SECOND speed clutch 12 and to the SECOND accumulator 76. In this arrangement, the engagement of the SECOND speed clutch 12 is controlled by the control pressure supplied from the second linear solenoid valve 87.

As described above, the primary pressure for the second linear solenoid valve 87 is taken from the pressure in the oil passage 138, which pressure is generated only when the forward/reverse selection hydraulic servomechanism 70 is set at the D range position. The second linear solenoid valve 87 adjusts this primary pressure and produces the secondary pressure or control pressure which is led into the oil passage 140. In this way, the hydraulic pressure generated only under the condition that the forward/reverse selection hydraulic servomechanism 70 is at the D range position is supplied as primary pressure to the second linear solenoid valve 87, and the control pressure produced by the second linear solenoid valve 87 is then supplied to the SECOND speed clutch 12. This control pressure supply is detected by the hydraulic switch 92. In other words, the hydraulic switch 92 is used to confirm that the forward/reverse selection hydraulic servomechanism 70 is set at the D range position.

Here, the control of the lock-up clutch performed by the fifth on/off solenoid valve 85 is described briefly. By the turning on or off of this solenoid valve 85, the position of the spool 68a of the fifth shift valve 68 is controlled leftward or rightward, respectively. In the condition where this spool 68a is shifted leftward, the oil passage 101e is connected with another oil passage 155, and the line pressure PL is supplied to the left end of the lock-up shift valve 51. On the other hand, in the condition where the spool 68a is shifted rightward, the oil passage 155 is connected to a drain at the fifth shift valve 68, so no pressure is supplied to the left end of the lock-up shift valve 51. In this way, the turning on and off of the fifth on/off solenoid valve 85 is utilized for the control of the actuation of the lock-up shift valve 51.

The lock-up shift valve 51 is a valve to turn on or off the lock-up actuation, and the engagement of the lock-up clutch is controlled by the control pressure supplied from the first linear solenoid valve 86. The control pressure from the first linear solenoid valve 86 is led to the oil passage 107, which is connected through another oil passage 157 to the lock-up control valve 52. Thus, the actuation of the lock-up control valve 52, which is controlled by the control pressure from the first linear solenoid valve 86, controls the engagement of the lock-up clutch. This engagement control of the lock-up clutch is carried out in the same way for the speed ratios which are equal to or higher than the SECOND speed ratio.

Now, a description is given of the THIRD mode, which is set for the engagement of the THIRD speed clutch 13. In this mode, the first~fourth on/off solenoid valves 81~84 are turned off and are closed. The fifth on/off solenoid valve 85 is turned on or off depending upon the condition of the lock-up clutch actuation control as in the above described mode. In this condition, the spool 60a of the first shift valve 60 is shifted rightward, the spool 62a of the second shift valve 62 is shifted rightward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. In this condition, the line pressure PL is supplied through the oil passage 138 to the second and third linear solenoid valves 87 and 88.

In this mode, the engagement of the THIRD speed clutch 13 is controlled by the control pressure supplied from the third linear solenoid valve 88 to the oil passage 142, which is connected with another oil passage 160 through the first shift valve 60. This oil passage 160 is then connected with another oil passage 161 through the second shift valve 62, and this oil passage 161 is then connected through the third shift valve 64 with the oil passage 151, which is connected to the THIRD speed clutch 13 and to the THIRD accumulator 77. In this arrangement, the engagement of the THIRD speed clutch 13 is controlled by the control pressure from the third linear solenoid valve 88.

Again, the primary pressure for the third linear solenoid valve 88 is taken from the pressure in the oil passage 138, which pressure is generated only when the forward/reverse selection hydraulic servomechanism 70 is set at the D range position. The third linear solenoid valve 88 adjusts this primary pressure and produces the secondary or control pressure which is led into the oil passage 142. In this way, the hydraulic pressure generated only under the condition that the forward/reverse selection hydraulic servomechanism 70 is at the D range position is supplied as primary pressure to the third linear solenoid valve 88, and the control pressure produced by the third linear solenoid valve 88 is then supplied to the THIRD speed clutch 13. This supply of the control pressure is detected by the hydraulic switch 91. In other words, the hydraulic switch 91 is used to confirm that the forward/reverse selection hydraulic servomechanism 70 is set at the D range position.

Now, a description is given of the 2-3-4 mode. This mode is set to shift the speed ratio of the transmission among the second, third and FOURTH speed ratios, i.e., to control the transition of speed ratio change. In this mode, the third on/off solenoid valve 83 is turned on and is opened while the first, second and fourth on/off solenoid valves 81, 82 and 84 are turned off and are closed. The fifth on/off solenoid valve 85 is used in the lock-up clutch actuation control as briefly described above. In the 2-3-4 mode, the spool 60a of the first shift valve 60 is shifted rightward, the spool 62a of the second shift valve 62 is shifted rightward, the spool 64a of the third shift valve 64 is shifted leftward, and the spool 66a of the fourth shift valve 66 is shifted leftward.

Also in this mode, as the fourth on/off solenoid valve 84 is turned off, the spool 58a of the D inhibitor valve 58 is maintained on the right side thereof. In this condition, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. In this condition, the line pressure PL is supplied through the oil passage 138 to the second and third linear solenoid valves 87 and 88.

In this mode, the engagement of the SECOND speed clutch 12, the THIRD speed clutch 13 and the FOURTH speed clutch 14 is controlled in correspondence to the actuation of the first, second and third linear solenoid valves 86, 87 and 88 to shift the transmission smoothly among these speed ratios.

The control pressure supplied from the first linear solenoid valve 86 to the oil passage 107 is led to the oil passage 108 through the CPB valve 56. This oil passage 108 is connected through the fifth shift valve 68 with the oil passage 128, which is connected with the oil passage 129 through the third shift valve 64. Then, this oil passage 129 is connected with the oil passage 147 through the second shift valve 62, and this oil passage 147 is connected with the oil passage 148 through the first shift valve 60. This oil passage 148 is then connected through the fourth shift valve 66 with the oil passage 149, which is connected to the SECOND speed clutch 12. In this arrangement, the engagement of the SECOND speed clutch 12 is controlled by the control pressure supplied from the first linear solenoid valve 86.

The control pressure from the second linear solenoid valve 87 is led to the oil passage 140, which is connected with the oil passage 113 through the third shift valve 64. This oil passage 113 is connected with the oil passage 114 through the second shift valve 62, and this oil passage 114 is connected to the FOURTH speed clutch 14 and to the FOURTH accumulator 78. In this arrangement, the engagement of the FOURTH speed clutch 14 is control by the control pressure supplied from the second linear solenoid valve 87.

The control pressure from the third linear solenoid valve 88 is supplied to the oil passage 142, which is connected with the oil passage 150 through the first shift valve 60. This oil passage 150 is then connected with the oil passage 151 through the third shift valve 64, and then this oil passage 151 is connected to the THIRD speed clutch 13 and to the THIRD accumulator 77. In this arrangement, the engagement control of the THIRD speed clutch 13 is controlled by the control pressure form the third linear solenoid valve 88.

Now, a description is given of the FOURTH mode, which is set for the engagement of the FOURTH speed clutch 14. In this mode, the first and third on/off solenoid valves 81 and 83 are turned on and are opened while the second and fourth on/off solenoid valves 82 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted rightward, the spool 64a of the third shift valve 64 is shifted leftward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. The line pressure PL is also supplied through the oil passage 138 to the second and third linear solenoid valves 87 and 88.

In this mode, the engagement of the FOURTH speed clutch 14 is controlled by the control pressure supplied from the second linear solenoid valve 87 to the oil passage 140, which is connected with the oil passage 113 through the third shift valve 64. This oil passage 113 is connected with the oil passage 114 through the second shift valve 62, and this oil passage 114 is then connected to the FOURTH speed clutch 14 and to the FOURTH accumulator 78. In this arrangement, the engagement of the FOURTH speed clutch 14 is controlled by the control pressure from the second linear solenoid valve 87.

Now, a description is made of the 4-5 mode, which is set to shift the speed ratio of the transmission between the fourth and FIFTH speed ratios, i.e., to control the transition of speed ratio change. In this mode, the first on/off solenoid valve 81 is turned on and is opened while the second~fourth on/off solenoid valves 82, 83 and 84 are turned off and are closed. The fifth on/off solenoid valve 85 is used in the lock-up clutch actuation control. In the 4-5 mode, the spool 60a of the first shift valve 60 is shifted leftward, the spool 62a of the second shift valve 62 is shifted rightward, the spool 64a of the third shift valve 64 is shifted rightward, and the spool 66a of the fourth shift valve 66 is shifted leftward.

Also in this mode, as the fourth on/off solenoid valve 84 is turned off, the spool 58a of the D inhibitor valve 58 is retained on the right side thereof. In this condition, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. Furthermore, the line pressure PL is supplied through the oil passage 138 to the second and third linear solenoid valves 87 and 88.

In this mode, the engagement of the FOURTH speed clutch 14 and of the FIFTH speed clutch 15 is controlled in correspondence to the actuation of the second and third linear solenoid valves 87 and 88, respectively, to change the speed ratio of the transmission smoothly.

The control pressure from the second linear solenoid valve 87 is led to the oil passage 140. This oil passage 140 is connected with the oil passage 113 through the third shift valve 64, and this oil passage 113 is connected through the second shift valve 62 with the oil passage 114, which is connected to the FOURTH speed clutch 14 and to the FOURTH accumulator 78. In this arrangement, the engagement of the FOURTH speed clutch 14 is controlled by the control pressure from the second linear solenoid valve 87.

On the other hand, the control pressure from the third linear solenoid valve 88 is led to the oil passage 142, which is connected with another oil passage 170 through first shift valve 60. This oil passage 170 is then connected through the third shift valve 64 with another oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

Now, a description is made of the FIFTH mode, which is set for the engagement of the FIFTH speed clutch 15. In this mode, the first and second on/off solenoid valves 81 and 82 are turned on and are opened while the third and fourth on/off solenoid valves 83 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted leftward, the spool 64a of the third shift valve 64 is shifted rightward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. The line pressure PL is also supplied through the oil passage 138 to the second and third linear solenoid valves 87 and 88.

In this mode, the engagement of the FIFTH speed clutch 15 is controlled by the control pressure supplied from the third linear solenoid valve 88 to the oil passage 142, which is connected with the oil passage 170 through the first shift valve 60. This oil passage 170 is connected through the third shift valve 64 with the oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

As described above, each mode is established by controlling the turning on and off of the first~fifth on/off solenoid valves 81~85 as listed in Table 1. The alphabets on the left side of Table 1, "R", "N" and "D", represent the reverse drive range, the neutral range and the forward drive range, respectively, which are switched one after another in correspondence to the manipulation of the shift lever at the driver's seat. For example, in a case where the shift lever is manipulated to shift the range setting of the transmission from the R range through the N range to the D range, at first, the Second NEUTRAL mode is set as the N range. In this N range condition, the rod 71 of the forward/reverse selection hydraulic servomechanism 70 is retained at the R range position without any force acting in the axial direction. Thereafter, when the shift lever is manipulated to the D range, the control system proceeds to set the transmission into the In-gear mode and then into the LOW mode.

On the other hand, in a case where the shift lever is manipulated to switch the range of the transmission from the D range to the N range and then from the N range to the R range, if the speed of the vehicle at the time of the switching to the N range is less than a critical speed or predetermined speed (e.g., 10 km/h), then the control system sets the Second NEUTRAL mode. When the transmission is switched into the N range, the spool 58a of the D inhibitor valve 58 is shifted from the forward drive position to the reverse drive position. As a result, the condition of the hydraulic circuit changes accordingly from the condition that the left side oil chamber 72 of the forward/reverse selection hydraulic servomechanism 70 is in fluid communication to a drain through the D inhibitor valve 58 (i.e., the condition for the D range) to the condition that the left side oil chamber 72 is now ready to receive the line pressure.

However, as mentioned previously, because the oil passage 104 which is in fluid communication to the left side oil chamber 72 through the passage 106 and the D inhibitor valve 58 is drained through the fifth shift valve 68 in the Second NEUTRAL mode, the rod 71 of the forward/reverse selection hydraulic servomechanism 70 is retained at the D range position without any force acting in the axial direction. Thereafter, when the shift lever is manipulated to the R range, the control system proceeds to set the transmission into the REVERSE mode. In this way, the forward/reverse selection hydraulic servomechanism 70 remains at the D range position while only the D inhibitor valve 58 shifts to the reverse drive position in the N range. Thereafter, the shift of the forward/reverse selection hydraulic servomechanism 70 to the R range position is controlled when the transmission is manipulated to shift into the R range. Therefore, the switching and setting of the ranges is controlled appropriately even if a solenoid valve malfunctions.

On the other hand, if the speed of the vehicle at the time of the switching to the N range is equal to or more than the critical speed (e.g., 10 km/h), then the control system sets the First NEUTRAL mode. As described above, in this mode, the rod 71 of the forward/reverse selection hydraulic servomechanism 70 is also retained at the D range position without any force acting in the axial direction. When the speed of the vehicle decreases below the critical speed, the First NEUTRAL mode is switched to the Second NEUTRAL mode. However, if the shift lever is manipulated to set the R range while the vehicle is driving still at a speed equal to or more than the critical speed, then the control system retains the First NEUTRAL mode and does not proceed to set the REVERSE mode, i.e., the control system provides the above mentioned inhibitor function. Thereafter, when the vehicle speed decreases below the critical speed, the control system proceeds to set the transmission into the REVERSE mode.

Finally, a description is made of the F/S (Fail Safe) SECOND mode. This mode is set to secure a certain driving performance by fixing the transmission to the SECOND speed ratio when the transmission experiences a breakdown. In this mode, the first~fourth on/off solenoid valves 81~84 are turned on and are opened while the fifth on/off solenoid valve 85 is turned off and is closed. In this condition, the spool 60a of the first shift valve 60 is shifted leftward, the spool 62a of the second shift valve 62 is shifted leftward, the spool 64a of the third shift valve 64 is shifted leftward, the spool 66a of the fourth shift valve 66 is shifted rightward, and the spool 68a of the fifth shift valve 68 is shifted leftward.

In this mode, the engagement of the SECOND speed clutch 12 is controlled by the control pressure supplied from the first linear solenoid valve 86 to the oil passage 107, which is connected with the oil passage 108 through the CPB valve 56. This oil passage 108 is connected with the oil passage 128 through the fifth shift valve 68, and this oil passage 128 is connected with the oil passage 129 through the third shift valve 64. This oil passage 129 is then connected with the oil passage 130 through the second shift valve 62, and this oil passage 130 is connected through the fourth shift valve 66 with the oil passage 149, which is connected to the SECOND speed clutch 12 and to the SECOND accumulator 76. In this arrangement, the engagement of the SECOND speed clutch 12 is controlled by the control pressure supplied from the first linear solenoid valve 86.

It can be understood from the above description that the engagement of the second~FIFTH speed clutches 12~15 are controlled for setting the SECOND mode and higher modes (excluding the F/S mode), respectively, by the control pressures which are supplied from the second and third linear solenoid valves 87 and 88. The primary pressures supplied to the second and third linear solenoid valves 87 and 88 are led through the forward/reverse selection hydraulic servomechanism 70. For example, if the forward/reverse selection hydraulic servomechanism 70 experiences an operational failure or if the D inhibitor valve 58 or the fourth shift valve 66, which is to control the supply of the line pressure into the right side oil chamber 73, malfunctions, then these clutches cannot be controlled systematically. However, the engagement of the SECOND speed clutch 12 in the F/S (Fail Safe) SECOND mode is controlled by the first linear solenoid valve 86, which utilizes the line pressure PL being supplied directly from the oil passage 100b bypassing the forward/reverse selection hydraulic servomechanism 70. Therefore, the SECOND speed ratio can be established regardless of any operational failure such as described above.

Figure 11:
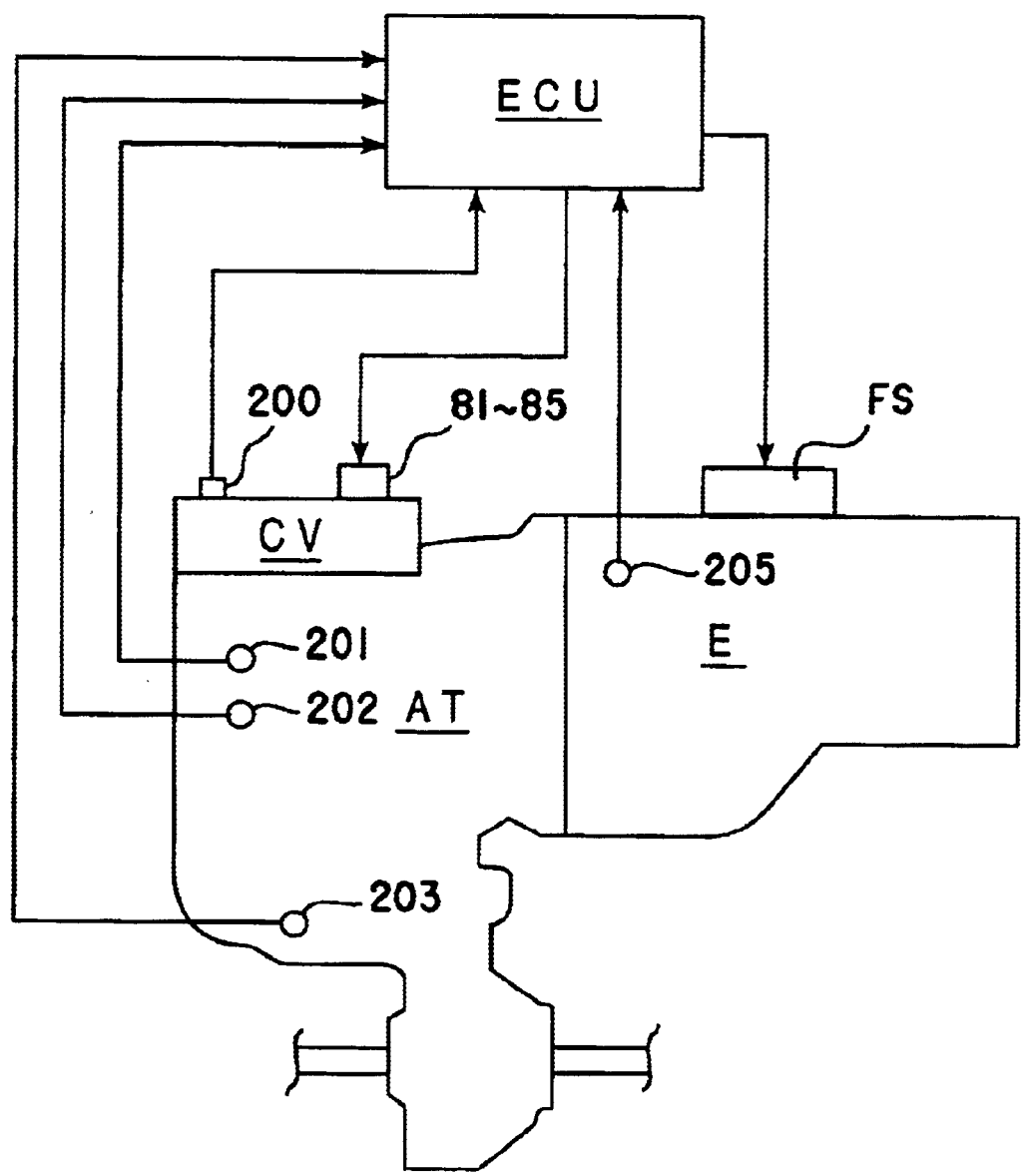
FIG. 11 is a schematic diagram describing the construction of the control system of the automatic transmission.

As described above, the speed change control system, which has the hydraulic circuit shown in FIGS. 5~10, controls the speed ratio change operation of the automatic transmission AT, whose construction is shown in FIGS. 1~4. FIG. 11 shows the construction of the control system, which controls the automatic transmission AT. The engine, whose output shaft Es is connected to the automatic transmission AT, is stopped by the control unit ECU, which controls a fuel-supply controller FS to stop the fuel supply, under a certain condition (for example, the vehicle is stopped with the accelerator being closed completely and the brake pedal being pressed). While the engine is stopped in this way, if the brake is released, and the accelerator pedal is pressed, then the engine is restarted, and the automatic transmission AT is set to a predetermined start-up speed ratio to start the vehicle.

Figure 12:
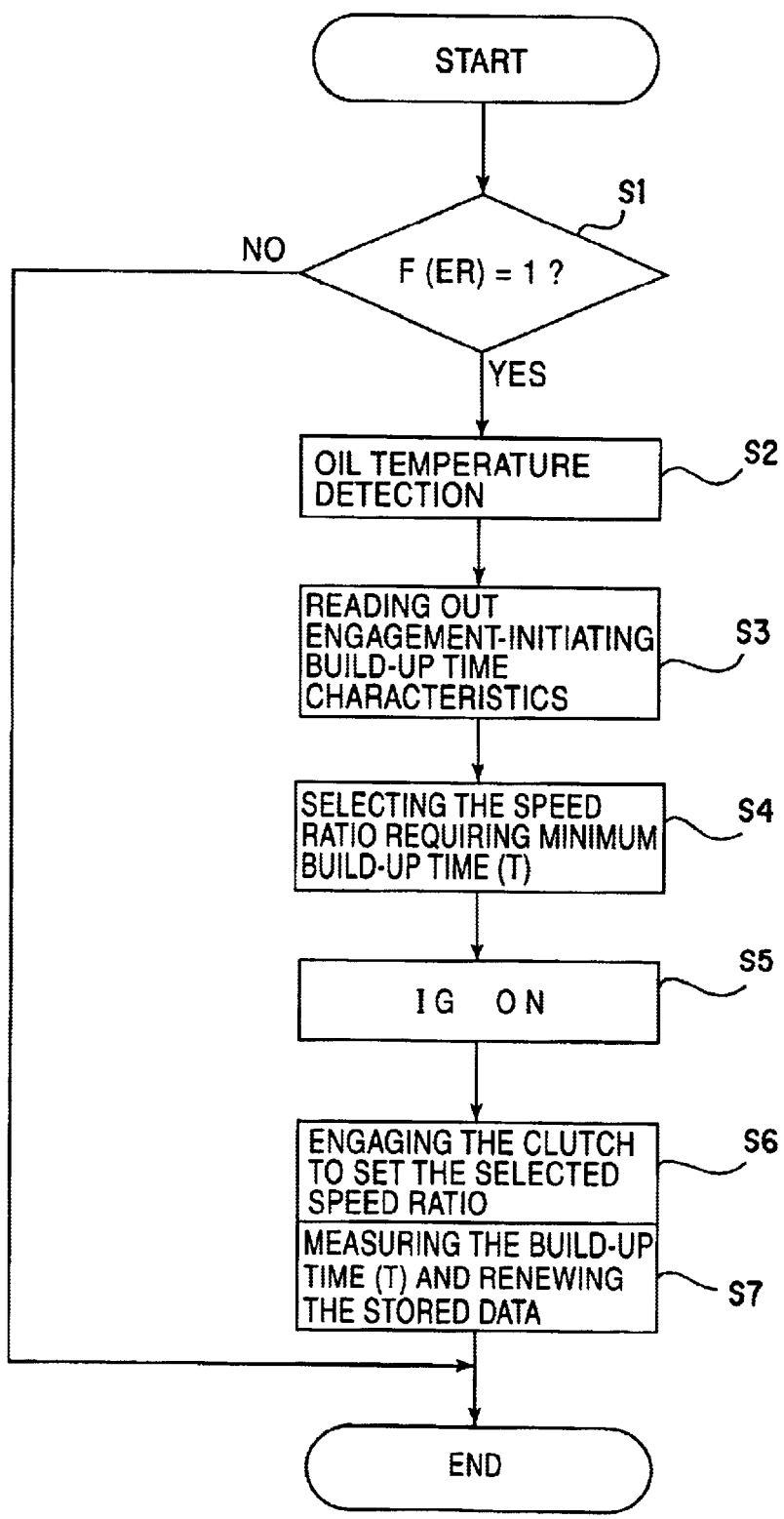
FIG. 12 is a flowchart showing control steps that are executed for engaging the starting clutch when the engine is restarted.

The present invention is to control the establishment of the start-up speed ratio in the speed change mechanism TM of the automatic transmission AT when the engine is restarted in this way. Now, this control is described in reference to FIG. 12~FIG. 14. As mentioned above, the fuel-supply controller FS cuts off the fuel supply to the engine E when a predetermined engine-stop condition is satisfied (this condition may be that, for example, the vehicle is stopped with the brake pedal being pressed and the accelerator pedal being released to close the accelerator completely), and the engine is stopped. The control steps shown in FIG. 12 are executed when the engine E is restarted from this condition. The following is a description of these control steps. In the control flow, at first, at Step S1, a determination is made whether the engine-restart flag F(ER), which is set up when the condition-required for restarting the engine is satisfied, is up or not (F(ER)=1 or not). If this flag is down (F(ER) =0), then the fuel cutoff is maintained to keep the engine E in stopped state.

On the other hand, if the result of the determination at Step S1 is that the engine-restart flag is up (F(ER)=1), then the control flow proceeds to Step S2, where the temperature of the oil used in the transmission is detected by an oil-temperature sensor 20, which is provided in the transmission. When the engine is restarted, the oil pump driven by the engine delivers oil to any of the speed ratio setting clutches (the LOW clutch 11, the SECOND speed clutch 12, the THIRD speed clutch 13, the FOURTH speed clutch 14 and the FIFTH speed clutch 15) to establish the speed ratio (the LOW ratio, the SECOND speed ratio, the THIRD speed ratio, the FOURTH speed ratio or the FIFTH speed ratio) that corresponds to this clutch. In this instance, the pressure in the oil chamber of the ratio-setting clutch increases to a predetermined low pressure that is the pressure level at which the actual engagement of the clutch begins. This pressure is referred to as "engagement-initiating pressure P($\alpha$)", and the time that takes to achieve this pressure is referred to as "engagement-initiating build-up time T". Values for the engagement-initiating build-up time T are predetermined by calculation or by experiment for possible oil temperatures for each ratio-setting clutch and are stored in memory. The detail of the calculation or measurement of the engagement-initiating build-up time T is described later in this section. At Step S3, the values of the engagement-initiating build-up time T for all the ratio-setting clutches, which values correspond to the oil temperature detected at Step S2, are read out from the memory of the control unit ECU. At Step S4, these values are compared to determine the speed ratio (or the ratio-setting clutch) that requires the minimum engagement-initiating build-up time T.

Now, the control flow proceeds to Step S5, where a start-up switch (ignition switch or IG switch) is turned on to start the engine. Then, at Step S6, the ratio-setting clutch for the speed ratio selected at Step S4 is brought into engagement (the solenoid valves 81~85, which constitute the shift control valve CV, are controlled, respectively on or off, in the way as shown in Table 1). Simultaneously, at Step S7, the pressure in the clutch is measured by pressure sensors 201 and 202. In this way, the actual engagement-initiating build-up time T is measured for this ratio-setting clutch, and this measured value for the engagement-initiating build-up time T is then replaced and renewed with the value stored in the memory, this stored value corresponding to the current temperature.

Figure 13:
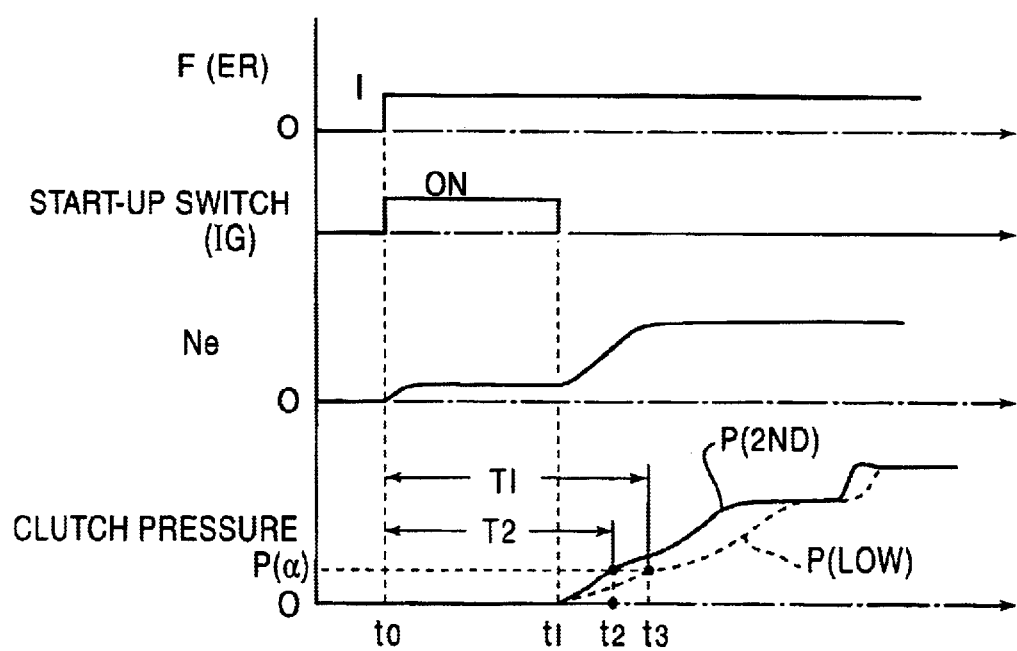
FIG. 13 is a chart showing chronological changes of various parameters observed while the engagement of the starting clutch is being controlled in response to the restarting of the engine.
Figure 14:
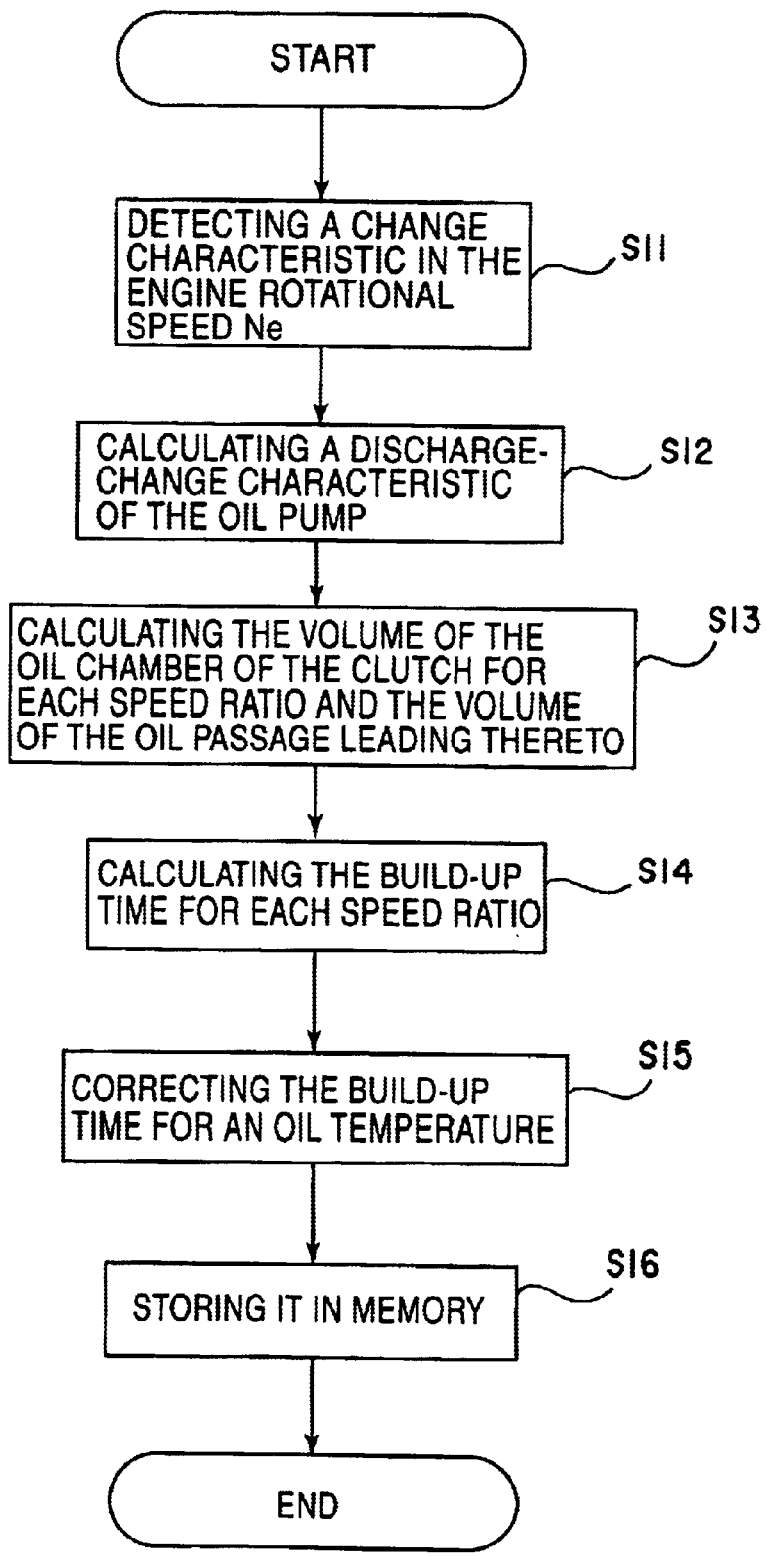
FIG. 14 is a flowchart showing steps that are executed for calculating an engagement-initiation time for the starting clutch to start the engagement after the restarting of the engine.

FIG. 13 shows chronological changes observed in various parameters while the control steps at Step S5 and Step S6 are being executed. It is clear from this graph that when the engine-restart flag F(ER) becomes 1 at time t0, the start-up switch (ignition switch) is turned on to start the engine E. In this case, the start-up switch is turned on from time t0 to time t1, and the rotational speed of the engine starts increasing at time t1 (this rotational speed is measured by a rotation sensor 205). While the start-up switch is turned on, the engine is rotated (cranked) by the cell motor at a low rotational speed. While the engine is rotated in this way, the oil pump, which is driven by the engine E, also operates at a rotational speed proportional to this low rotational speed of the engine and delivers oil to the ratio-setting clutch, which is selected at Step S6, by a flow corresponding to the rotation.

As a result, the pressure in the oil chamber of the ratio-setting clutch (measured by the pressure sensors 201 and 202) increases gradually as shown in the graph. In this instance, whether this pressure has reached the engagement-initiating pressure P($\alpha$) or not is determined by a pressure switch 200, which is provided in the oil passage leading to the ratio-setting clutch. In FIG. 13, the pressure change of the LOW clutch 11 is shown by a broken line for a case where the LOW clutch 11 is selected as the ratio-setting clutch (starting clutch) at the time of the engine restarting, and that of the SECOND speed clutch 12 is shown by a real line for a case where the SECOND speed clutch 12 is selected as the ratio-setting clutch (starting clutch) at the time of the engine restarting.

The pressure-change characteristics of the clutches including the LOW clutch 11 and the SECOND speed clutch 12 are different from one another because the pressure-change characteristics are dependent on the construction and the volume of the oil chamber of each clutch and the oil passage leading thereto. In the graph of FIG. 13, it is clear that the pressure of the LOW clutch 11 changes more gradually than that of the SECOND speed clutch 12, and that the engagement-initiating build-up time T1, which is required for the pressure supplied to the LOW clutch 11 to reach the engagement-initiating pressure P($\alpha$), is longer than the engagement-initiating build-up time T2 required for the pressure supplied to the SECOND speed clutch 12 to reach the engagement-initiating pressure P($\alpha$). Therefore, the SECOND speed clutch 12, rather than the LOW clutch 11, is selected as the starting clutch and supplied with an engagement pressure, so that the starting clutch is set more quickly into engagement to start the vehicle smoothly. In this way, at Step S4, the speed ratio is selected to minimize the engagement-initiating build-up time T for the starting clutch.

As described above, the engagement-initiating build-up time T is an essential factor for the selection of the starting clutch. Now, the calculation or measurement of the engagement-initiating build-up time T is described in reference to FIG. 14. The initial value of the engagement-initiating build-up time T is calculated from the volume of each clutch and the oil passage leading thereto or determined by an actual measurement and then stored in memory. In this calculation or measurement, a detection is made for a characteristic of change in the rotational speed Ne of the engine at Step S11. This characteristic is a chronological change in the rotational speed of the engine, which change is measured by the rotation sensor 205, for example, in an experiment, when the start-up switch is turned on to start the engine from stopped state.

After the detection of this characteristic, the control flow proceeds to Step S12, where a calculation is made for a discharge-change characteristic of the oil pump, which is driven by the engine, under the above rotational speed change characteristic. Furthermore, calculations are made for the volume of the oil passage leading to the clutch used for establishing each speed ratio and for the volume of the oil chamber of each clutch at Step S13. Then, the control flow proceeds to Step S14, where a calculation is made for the engagement-initiating build-up time T required for the pressure of each ratio-setting clutch to reach the engagement-initiating pressure $P(\alpha)$ when oil is supplied from the oil pump having the above discharge-change characteristic.

However, the engagement-initiating build-up time T calculated in this way is for a predetermined temperature of the oil. As the temperature of the oil fluctuates, the viscosity of the oil will fluctuate as well. As a result, the pressure build-up characteristic of each clutch changes, leading to changes in the engagement-initiating build-up time T. Therefore, calculations are made to correct the values of the engagement-initiating build-up time T at Step S15, so that these corrected values will correspond to oil temperature changes. These corrected values are stored in memory at Step S16.

Instead of calculating the engagement-initiating build-up time for each temperature value in this way and storing it in memory, the engagement-initiating build-up time may be calculated only for a reference temperature, and, additionally, correction factors are calculated to correct and make this engagement-initiating build-up time for the reference temperature applicable to any possible temperature. These temperature correction factors and the engagement-initiating build-up time for the reference temperature are then stored in memory.

As described above, an engine-restart starting control system according to the present invention selects the frictionally engaging element that requires a minimum time to reach a predetermined engagement pressure and sets this frictionally engaging element to establish the start-up speed ratio. When the engine is restarted from stopped state to start the vehicle, pressure supply control means supplies oil to the frictionally engaging element used for the start-up speed ratio, which requires the minimum time for initiating the engagement, and brings this frictionally engaging element into engagement. As a result, the vehicle is started smoothly and quickly without any lag.

Oil-temperature detecting means is provided to detect the temperature of oil supplied to the frictionally engaging element, and the engagement-initiation time, i.e., the time required for the pressure of a frictionally engaging element to reach the predetermined engagement pressure when the hydraulic pressure is supplied by the pressure supply control means, is calculated for each possible temperature for each of the frictionally engaging elements. Preferably, the frictionally engaging element requiring the minimum engagement-initiation time at the temperature detected by the oil-temperature detecting means is selected as the frictionally engaging element for the start-up speed ratio. In this way, the engagement-initiation time is minimized for any possible temperature of the oil, so the vehicle can be controlled to start without any lag.

Furthermore, characteristic memory means is provided to store the engagement-initiation time characteristic of each frictionally engaging element. When a frictionally engaging element is supplied with oil and brought into engagement at the restarting of the engine from stopped state, the engagement-initiation time characteristic of the frictionally engaging element is determined by measurement, and this engagement-initiation time characteristic is preferably replaced and renewed with the corresponding engagement-initiation time characteristic stored in the characteristic memory means. In this way, an optimal control can be executed to meet the actual characteristic of the frictionally engaging element.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-218335 filed on Jul. 18, 2001 which is incorporated herein by reference.

What is claimed is:

1. An engine-restart starting control system for a transmission comprising an engine and a speed change mechanism, said engine being controllable to stop under a predetermined condition, and said speed change mechanism transmitting output rotation of said engine at different speed ratios;

wherein:
said speed change mechanism comprises a plurality of transmission paths arranged in parallel, a plurality of frictionally engaging elements for selecting individually said transmission paths, and engagement-pressure supply control means for selectively supplying a hydraulic pressure to said frictionally engaging elements so as to selectively bring said frictionally engaging elements into engagement;

engagement-initiation time required for pressure of a frictionally engaging element to reach a predetermined engagement pressure when the hydraulic pressure is supplied by said engagement-pressure supply control means is calculated for each of said frictionally engaging elements, so that the frictionally engaging element requiring a minimum engagement-initiation time is selected as the frictionally engaging element for a start-up speed ratio; and when said engine is restarted from stopped state, said pressure supply control means directs a supply of oil to the selected frictionally engaging element for the start-up speed ratio.

2. The engine-restart starting control system as set forth in claim 1, further comprising characteristic memory means for storing an engagement-initiation time characteristic for each frictionally engaging element;

wherein:
when said engine is restarted from stopped state, and said frictionally engaging element is supplied with oil and brought into engagement, the engagement-initiation time characteristic of said frictionally engaging element is determined by measurement; and the engagement-initiation time characteristic determined by measurement is replaced and renewed with the engagement-initiation time characteristic that is stored in said characteristic memory means.

3. The engine-restart starting control system as set forth in claim 1, further comprising oil-temperature detecting means for detecting a temperature of oil supplied to said frictionally engaging elements;

wherein:

said engagement-initiation time required for the pressure of said frictionally engaging element to reach the predetermined engagement pressure when the hydraulic pressure is supplied by said engagement-pressure supply control means is calculated for each oil temperature for each of said frictionally engaging elements; and said frictionally engaging element that requires a minimum engagement-initiation time at the temperature detected by said oil-temperature detecting means is selected as the frictionally engaging element for the start-up speed ratio.

4. The engine-restart starting control system as set forth in claim 3, further comprising characteristic memory means for storing an engagement-initiation time characteristic for each frictionally engaging element;

wherein:

when said engine is restarted from stopped state, and said frictionally engaging element is supplied with oil and brought into engagement, the engagement-initiation time characteristic of said frictionally engaging element is determined by measurement; and the engagement-initiation time characteristic determined by measurement is replaced and renewed with the engagement-initiation time characteristic that is stored in said characteristic memory means.

5. The engine-restart starting control system as set forth in claim 1, wherein:

said predetermined condition is a condition where an accelerator is closed completely with a brake being operated; and when the accelerator is closed completely with the brake being operated, fuel supply is cut off to stop said engine.

6. The engine-restart starting control system as set forth in claim 5, wherein:

while said engine is controlled to remain in stopped state, when an accelerator pedal is pressed with said brake being released, said engine is restarted.

* * * * *